(12) United States Patent
Kim et al.

(10) Patent No.: US 12,470,310 B2
(45) Date of Patent: Nov. 11, 2025

(54) ELECTRONIC DEVICE AND METHOD FOR DETERMINING RF MODULE FOR BEAMFORMING THEREOF

(71) Applicant: Samsung Electronics Co., Ltd., Suwon-si (KR)

(72) Inventors: Junsuk Kim, Suwon-si (KR); Minho Yang, Suwon-si (KR); Junyoung Woo, Suwon-si (KR); Hyoungjoo Lee, Suwon-si (KR); Yonggue Han, Suwon-si (KR); Taeyoon Kim, Suwon-si (KR); Euichang Jung, Suwon-si (KR); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 18/347,191

(22) Filed: Jul. 5, 2023

(65) Prior Publication Data

US 2023/0344534 A1    Oct. 26, 2023

Related U.S. Application Data

(63) Continuation of application No. PCT/KR2022/017375, filed on Nov. 7, 2022.

(30) Foreign Application Priority Data

Nov. 11, 2021    (KR) .................. 10-2021-0155034

(51) Int. Cl.
*H04M 11/00* (2006.01)
*H04B 7/08* (2006.01)
(Continued)

(52) U.S. Cl.
CPC ......... *H04B 17/318* (2015.01); *H04B 7/0817* (2013.01); *H04B 7/0834* (2013.01); *H04B 7/0897* (2013.01); *H04W 76/28* (2018.02)

(58) Field of Classification Search
CPC .. H04B 17/318; H04B 17/327; H04B 7/0617; H04B 7/0817; H04B 7/0834; H04B 7/0897; H04W 64/003
See application file for complete search history.

(56) References Cited

U.S. PATENT DOCUMENTS 8,620,324 B2    12/2013  Jeong et al.
9,888,415 B1 *   2/2018  Govindassamy ..... H04W 48/12
(Continued)

FOREIGN PATENT DOCUMENTS

KR    10-2016-0052975 A    5/2016
KR    10-2020-0136625 A    12/2020
(Continued)

OTHER PUBLICATIONS

International Search Report with Written Opinion dated Feb. 15, 2023; International Patent Application No. PCT/KR2022/017375.

*Primary Examiner* — Tuan Pham
(74) *Attorney, Agent, or Firm* — Jefferson IP Law, LLP

(57) ABSTRACT

An electronic device is provided. The electronic device includes a wireless communication circuit including a plurality of radio frequency (RF) modules, a memory configured to store a plurality of reference values for classifying a plurality of areas within a cell to which the electronic device belongs, and a processor, and the processor may be configured to determine, based on at least one of a first broadcasting signal received from a base station in the cell and the plurality of reference values stored in the memory, at least one RF module among the plurality of RF modules to monitor a second broadcasting signal transmitted from the base station and a period of the monitoring, and perform the (Continued)

monitoring by using the determined at least one RF module according to the determined period.

19 Claims, 20 Drawing Sheets

(51) Int. Cl.
*H04B 17/318* (2015.01)
*H04W 76/28* (2018.01)

(56) References Cited

U.S. PATENT DOCUMENTS

| | | | |
|---|---|---|---|
| 10,728,823 | B2 | 7/2020 | Cheng et al. |
| 10,998,956 | B1 | 5/2021 | Pal et al. |
| 2013/0023302 | A1 | 1/2013 | Sivanesan et al. |
| 2014/0112310 | A1 | 4/2014 | Teyeb et al. |
| 2014/0287770 | A1 | 9/2014 | Liu et al. |
| 2015/0350976 | A1 | 12/2015 | Kodali et al. |
| 2020/0100131 | A1 | 3/2020 | Yang et al. |
| 2020/0374874 | A1* | 11/2020 | Ke .................... H04W 72/0446 |
| 2021/0068077 | A1 | 3/2021 | Raghavan et al. |
| 2021/0211957 | A1 | 7/2021 | Kamohara et al. |
| 2021/0259037 | A1 | 8/2021 | Kim et al. |
| 2021/0266050 | A1 | 8/2021 | Sahoo et al. |
| 2021/0392525 | A1 | 12/2021 | Kaikkonen et al. |
| 2022/0110032 | A1* | 4/2022 | Zheng ............... H04W 36/0085 |

FOREIGN PATENT DOCUMENTS

| | | |
|---|---|---|
| WO | 2020/089388 A1 | 5/2020 |
| WO | 2020-067449 A1 | 3/2021 |

* cited by examiner

Dual Module based
Neighbor Cell Measurement

ELECTRONIC DEVICE AND METHOD FOR DETERMINING RF MODULE FOR BEAMFORMING THEREOF

CROSS-REFERENCE TO RELATED APPLICATION(S)

This application is a continuation application, claiming priority under § 365(c), of an International application No. PCT/KR2022/017375, filed on Nov. 7, 2022, which is based on and claims the benefit of a Korean patent application number 10-2021-0155034, filed on Nov. 11, 2021, in the Korean Intellectual Property Office, the disclosure of each of which is incorporated by reference herein in its entirety.

BACKGROUND

1. Field

The disclosure relates to an electronic device. More particularly, the disclosure relates to an electronic device supporting fifth generation (5G) new radio (NR) wireless communication.

2. Description of Related Art

To meet the demand for wireless data traffic having increased since deployment of fourth generation (4G) communication systems, a 5G communication system has been developed and deployed. The 5G communication system is considered to be implemented in ultrahigh frequency millimeter wave (mmWave) bands (e.g., 60 gigahertz (GHz) or higher bands). To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In new radio (NR) that is the 3rd generation partnership project (3GPP)-based 5G mobile communication standard, depending on the frequency band used for mobile communication, it may be divided into frequency range (FR) 1 using the sub-6 GHz band and FR 2 using the above-6 GHz band. In this case, in the FR 2 band based on the mmWave band, the transmission characteristics may be poor because the straightness is very high compared to the FR 1 band which is a relatively low frequency. Accordingly, in 5G NR mobile communication, a beamforming technology may be used to compensate for propagation loss due to the use of an ultra-high frequency band. Beamforming technology is a technology for increasing reception gain by concentrating a beam of an antenna in a specific direction to have a narrow range of radio wave transmission and reception. In order to communicate with the network in the FR 2 band (mmWave) of 5G NR mobile communication, an electronic device may include a plurality of radio frequency (RF) modules in charge of a specific area to transmit/receive signals coming from a wide area, respectively, and select some of the RF modules according to circumstances to transmit/receive signals.

The above information is presented as background information only to assist with an understanding of the disclosure. No determination has been made, and no assertion is made, as to whether any of the above might be applicable as prior art with regard to the disclosure.

SUMMARY

An electronic device supporting 5G NR may be limited to transmitting and receiving signals in a narrow direction due to beamforming technology. Accordingly, the electronic device may continuously perform an operation for finding a direction for optimal signal transmission and reception based on the synchronization signal block (SSB) transmitted from a base station of the network. To this end, the electronic device may find the most suitable RF module and beam while performing channel measurement on beams that may be received by using a plurality of RF modules.

A conventional electronic device may perform SSB monitoring by fixedly configuring a search range and period of an RF module according to a preconfigured criterion. Accordingly, in the conventional electronic device, cell measurement may be distorted in an environment where a plurality of cells overlap, a handover event may occur late due to a low measurement result for a neighbor cell, and current consumption may be increased because the terminal is in a non-sleep state for a long time in a connected mode discontinuous reception (CDRX) environment.

Aspects of the disclosure are to address at least the above-mentioned problems and/or disadvantages and to provide at least the advantages described below. Accordingly, an aspect of the disclosure is to provide an electronic device capable of intensively performing effective SSB measurement at the required time by determining the area and time point suitable for RF module monitoring and neighbor cell measurement and a method for selecting an RF module for beamforming.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit including a plurality of RF modules, a memory configured to store a plurality of reference values for classifying a plurality of areas within a cell to which the electronic device belongs, and a processor, and the processor may be configured to determine, based on at least one of a first broadcasting signal received from a base station in the cell and the plurality of reference values stored in the memory, at least one RF module among the plurality of RF modules to monitor a second broadcasting signal transmitted from the base station and a period of the monitoring, and perform the monitoring by using the determined at least one RF module according to the determined period.

In accordance with another aspect of the disclosure, a method of selecting a RF module for beamforming of an electronic device is provided. The electronic device includes a plurality of RF modules, and a memory configured to store a plurality of reference values for classifying a plurality of areas within a cell to which the electronic device belongs, the method may include determining, based on at least one of a first broadcasting signal received from a base station in the cell and a plurality of reference values stored in the memory, at least one RF module among the plurality of RF modules to monitor a second broadcasting signal transmitted from the base station and a period of the monitoring, and performing the monitoring by using the determined at least one RF module according to the determined period.

An electronic device and a method for selecting an RF module for beamforming of the electronic device according to various embodiments may determine an area and time point suitable for RF module monitoring and neighbor cell measurement, and intensively perform effective SSB measurement at a necessary time point. Accordingly, it is possible to improve current consumption and handover performance during CDRX operation in a cell environment of the FR 2 band.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
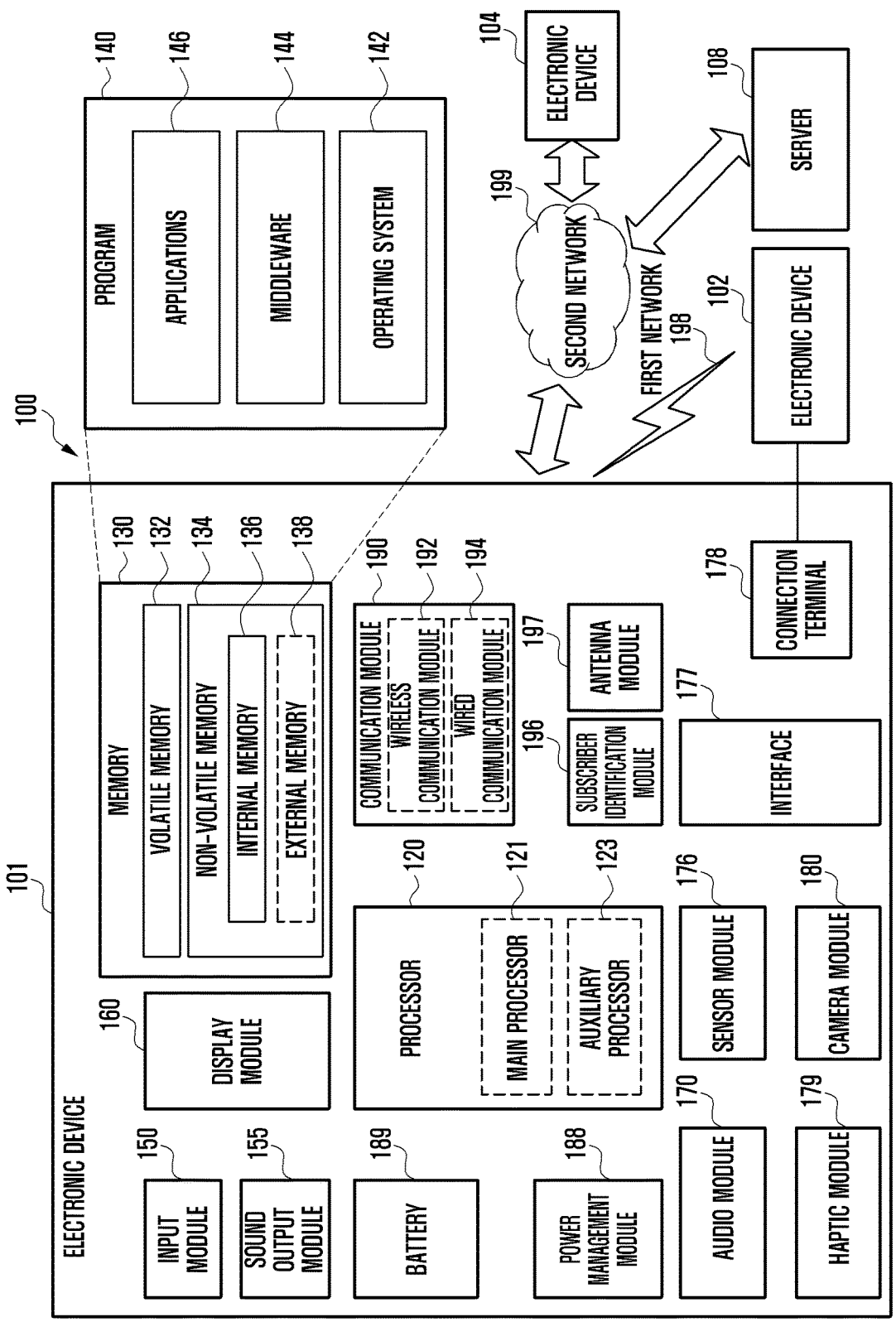
FIG. 1 is a block diagram of an electronic device in a network environment according to an embodiment of the disclosure.

FIG. 1 is a block diagram illustrating an electronic device in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to another embodiment, the electronic device 101 may communicate with the electronic device 104 via the server 108. According to yet another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to a further embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to still another embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to a further embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to still another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to yet another embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to a further embodiment, the haptic module 179 may include, for example, a motor, a piezoelectric element, or an electric stimulator.

The camera module 180 may capture a still image or moving images. According to still another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to a further embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to still another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the electronic device 102, the electronic device 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the electronic device 104 may include an internet-of-things (IoT) device. The server 108 may be an intelligent server using machine learning and/or a neural network. According to yet another embodiment, the electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to a further embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to still another embodiment, the module is implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) invokes at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
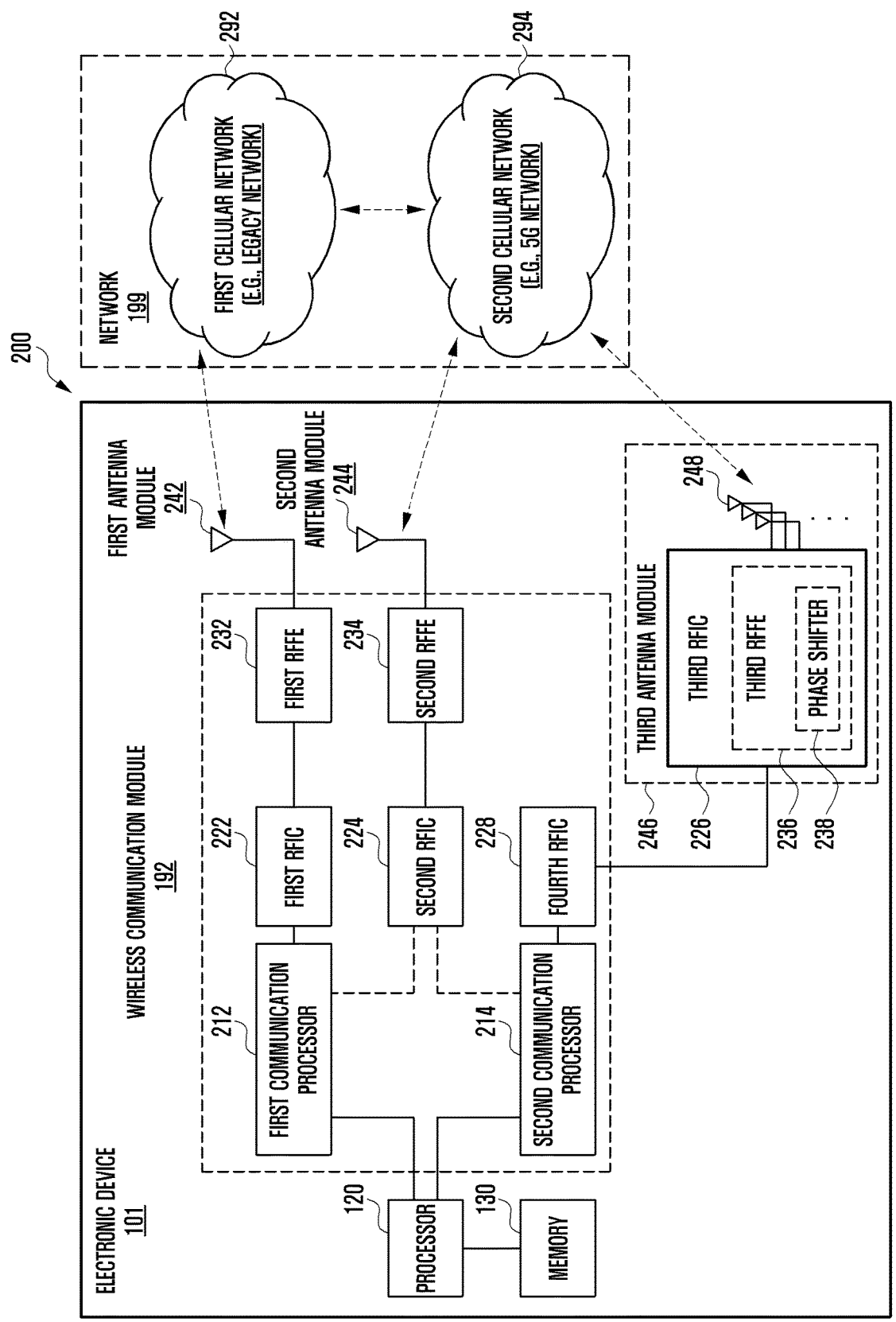
FIG. 2 is a block diagram of an electronic device for supporting legacy network communication and 5G network communication according to an embodiment of the disclosure.

FIG. 2 is a block diagram of an electronic device for supporting legacy network communication and 5G network communication according to an embodiment of the disclosure.

Referring to FIG. 2, an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of the components illustrated in FIG. 1, and the second network 199 may further include at least one other network. According to another embodiment, the first communication processor 212, the second communication processor 214, the first RFIC 222, the second RFIC 224, the fourth RFIC 228, the first RFFE 232, and the second RFFE 234 may compose at least a part of a wireless communication module 192. According to another embodiment, the fourth RFIC 228 may be omitted or included as part of the third RFIC 226.

The first communication processor 212 may establish a communication channel of a band to be used for wireless communication with the first cellular network 292, and support legacy network communication through the established communication channel. According to various embodiments, the first network may be a legacy network including a second generation (2G), third generation (3G), 4G, or long term evolution (LTE) network. The second communication processor 214 may establish a communication channel corresponding to a designated band (e.g., about 6 GHz to about 60 GHz) among bands to be used for wireless communication with the second cellular network 294, and support 5G network communication through the established communication channel. According to various embodiments, the second cellular network 294 may be a 5G network defined by 3GPP. In addition, according to yet another embodiment, the first communication processor 212 or the second communication processor 214 may establish a communication channel corresponding to another designated band (e.g., about 6 GHz or less) among bands to be used for wireless communication with the second cellular network 294, and support 5G network communication through the established communication channel. According to a further embodiment, the first communication processor 212 and the second communication processor 214 may be implemented on a single chip or in a single package. According to various embodiments, the first communication processor 212 or the second communication processor 214 may be composed on a single chip or in a single package with the processor 120, the auxiliary processor 123 or the communication module 190.

The first RFIC 222 may convert, during transmission, the baseband signal generated by the first communication processor 212 into a radio frequency (RF) signal of about 700 megahertz (MHz) to about 3 GHz used in the first cellular network 292 (e.g., a legacy network). Upon reception, an RF signal may be obtained from the first cellular network 292 (e.g., a legacy network) through an antenna (e.g., the first antenna module 242), and preprocessed through an RFFE (e.g., the first RFFE 232). The first RFIC 222 may convert the preprocessed RF signal into a baseband signal to be processed by the first communication processor 212.

The second RFIC 224 may convert, during transmission, the baseband signal generated by the first communication processor 212 or the second communication processor 214 into an RF signal (hereinafter referred to as a 5G sub-6 RF signal) of a sub-6 band (e.g., about 6 GHz or less) used in the second cellular network 294 (e.g., a 5G network). Upon reception, a 5G sub-6 RF signal may be obtained from the second cellular network 294 (e.g., a 5G network) through an antenna (e.g., the second antenna module 244), and preprocessed through an RFFE (e.g., the second RFFE 234). The second RFIC 224 may convert the preprocessed 5G sub-6 RF signal into a baseband signal to be processed by a corresponding communication processor among the first communication processor 212 and the second communication processor 214.

The third RFIC 226 may convert the baseband signal generated by the second communication processor 214 into an RF signal (hereinafter referred to as a 5G above-6 RF signal) of a 5G above-6 band (e.g., about 6 GHz to about 60 GHz) used in the second cellular network 294 (e.g., a 5G network). Upon reception, a 5G above-6 RF signal may be obtained from the second cellular network 294 (e.g., a 5G network) through an antenna (e.g., the antenna 248), and preprocessed through the third RFFE 236. The third RFIC 226 may convert the preprocessed 5G above-6 RF signal into a baseband signal to be processed by the second communication processor 214. According to still another embodiment, the third RFFE 236 may be composed as part of the third RFIC 226.

According to an embodiment, the electronic device 101 may include the fourth RFIC 228 separately from or at least as part of the third RFIC 226. In this case, the fourth RFIC 228 may convert the baseband signal generated by the second communication processor 214 into an RF signal (hereinafter referred to as an IF signal) of an intermediate frequency band (e.g., about 9 GHz to about 11 GHz) and transfer the IF signal to the third RFIC 226. The third RFIC 226 may convert the IF signal into a 5G above-6 RF signal. Upon reception, the 5G above-6 RF signal may be received from the second cellular network 294 (e.g., a 5G network) through an antenna (e.g., the antenna 248) and converted to an IF signal by the third RFIC 226. The fourth RFIC 228 may convert the IF signal into a baseband signal so that the second communication processor 214 may process the same.

According to another embodiment, the first RFIC 222 and the second RFIC 224 may be implemented as a single chip or at least part of a single package. According to yet another embodiment, the first RFFE 232 and the second RFFE 234 may be implemented as a single chip or at least part of a single package. According to a further embodiment, at least one antenna module among the first antenna module 242 and the second antenna module 244 may be omitted or combined with another antenna module to process RF signals of a plurality of corresponding bands.

According to still another embodiment, the third RFIC 226 and the antenna 248 may be disposed on the same substrate to compose third antenna module 246. For example, the wireless communication module 192 or the processor 120 is disposed on a first substrate (e.g., main PCB). In this case, the third antenna module 246 may be composed by disposing the third RFIC 226 on a partial area (e.g., a lower surface) of a second substrate (e.g., a sub PCB) separate from the first substrate, and the antenna 248 on another partial area (e.g., an upper surface). By disposing the third RFIC 226 and the antenna 248 on the same substrate, it is possible to reduce the length of the transmission line therebetween. For example, loss (e.g., attenuation) of a signal of a high frequency band (e.g., about 6 GHz to about 60 GHz) used in 5G network communication by a transmission line is reduced. As a result, the electronic device 101 may improve the quality or speed of communication with the second cellular network 294 (e.g., a 5G network).

According to an embodiment, the antenna 248 may be composed as an antenna array including a plurality of antenna elements that may be used for beamforming. In this case, the third RFIC 226 may include, for example, a plurality of phase shifters 238 corresponding to a plurality of antenna elements as a part of the third RFFE 236. Upon transmission, each of the plurality of phase converters (e.g., phase shifters) 238 may convert the phase of a 5G above-6 RF signal to be transmitted to the outside (e.g., a base station of a 5G network) of the electronic device 101 through a corresponding antenna element. Upon reception, each of the plurality of phase converters (e.g., phase shifters) 238 may convert the phase of the 5G above-6 RF signal received from the outside through the corresponding antenna element into the same or substantially the same phase. This enables transmission or reception through beamforming between the electronic device 101 and the outside.

The second cellular network 294 (e.g., a 5G network) may be operated independently (e.g., Stand-Alone (SA)) or connected to the first cellular network 292 (e.g., a legacy network) (e.g., Non-Stand Alone (NSA)). For example, a 5G network includes only an access network (e.g., a 5G radio access network (RAN) or a next generation RAN (NG RAN)) but no core network (e.g., a next generation core (NGC)). In this case, after accessing the access network of the 5G network, the electronic device 101 may access an external network (e.g., the Internet) under the control of a core network (e.g., evolved packed core (EPC)) of the legacy network. Protocol information (e.g., LTE protocol information) for communication with a legacy network or protocol information (e.g., new radio (NR) protocol information) for communication with a 5G network may be stored in the memory 230 and may be accessed by other components (e.g., the processor 120, the first communication processor 212, or the second communication processor 214).

Figure 3:
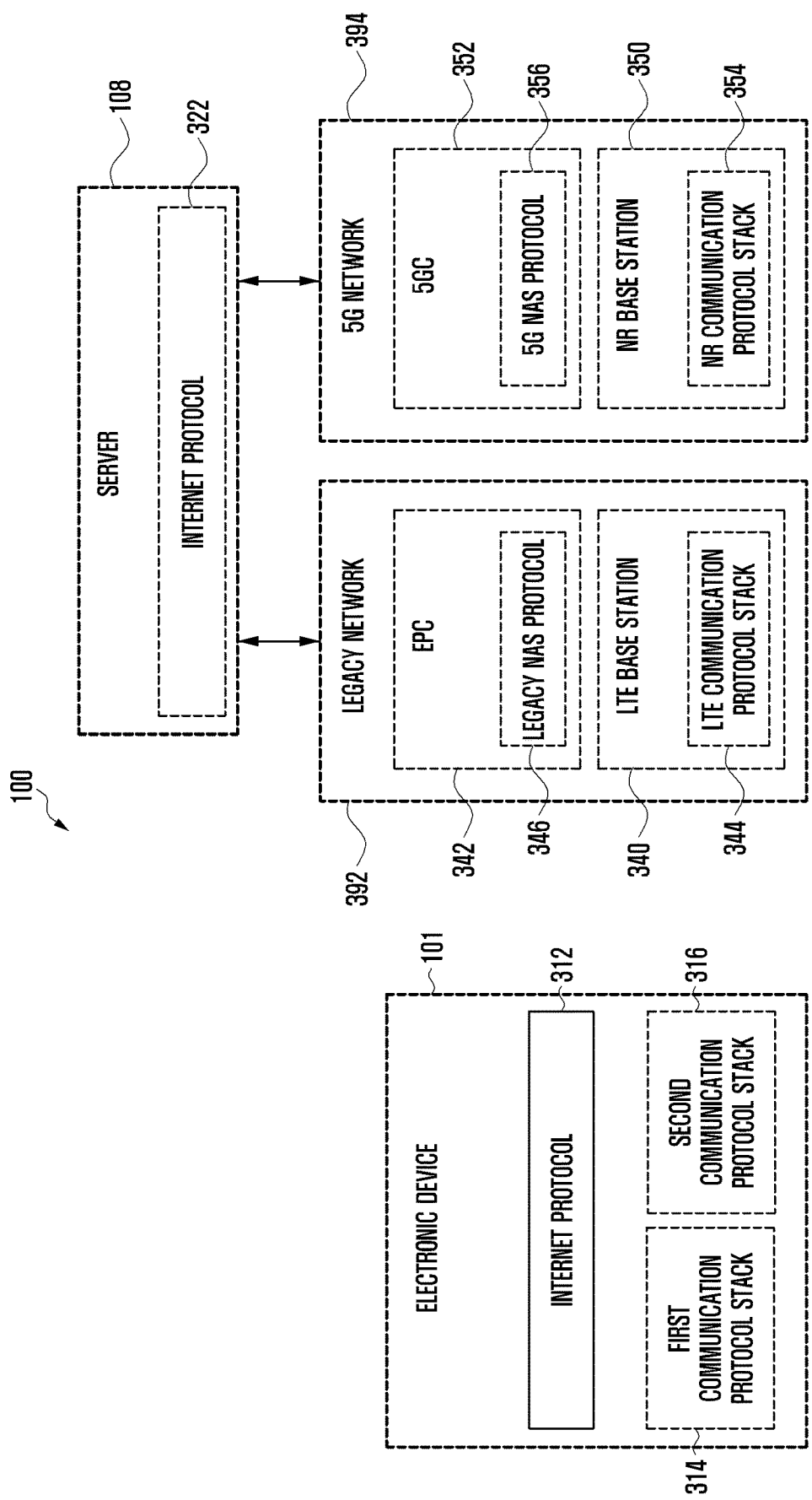
FIG. 3 is a diagram illustrating a protocol stack structure of a network of legacy communication and/or 5G communication according to an embodiment of the disclosure.

FIG. 3 is a diagram illustrating a protocol stack structure of a network of legacy communication and/or 5G communication according to an embodiment of the disclosure.

Referring to FIG. 3, a network environment 100 according to the illustrated embodiment may include an electronic device 101, a legacy network 392, a 5G network 394 and a server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to another embodiment, the electronic device 101 may perform Internet communication related to the server 108 by using the Internet protocol 312 (e.g., transmission control protocol (TCP), user datagram protocol (UDP), or internet protocol (IP)). The Internet protocol 312 may be executed, for example, in a main processor (e.g., the main processor 121 of FIG. 1) included in the electronic device 101.

According to another embodiment, the electronic device 101 may wirelessly communicate with the legacy network 392 by using the first communication protocol stack 314. According to another embodiment, the electronic device 101 may wirelessly communicate with the 5G network 394 by using the second communication protocol stack 316. The first communication protocol stack 314 and the second communication protocol stack 316 may be executed, for example, in one or more communication processors (e.g., the wireless communication module 192 of FIG. 1) included in the electronic device 101.

The server 108 may include an Internet Protocol 322. The server 108 may transmit and receive data related to the Internet Protocol 322 to and from the electronic device 101 through the legacy network 392 and/or the 5G network 394. According to yet another embodiment, the server 108 may include a cloud computing server that exists outside of the legacy network 392 or the 5G network 394. In another embodiment, the server 108 may include an edge computing server (or a mobile edge computing (MEC) server) located inside at least one of the legacy network or the 5G network 394.

The legacy network 392 may include an LTE base station 340 and an EPC 342. The LTE base station 340 may include an LTE communication protocol stack 344. The EPC 342 may include a legacy NAS protocol 346. The legacy network 392 may perform LTE wireless communication with the electronic device 101 by using the LTE communication protocol stack 344 and the legacy NAS protocol 346.

The 5G network 394 may include a NR base station 350 and a 5GC 352. The NR base station 350 may include an NR communication protocol stack 354. The 5GC 352 may include a 5G NAS protocol 356. The 5G network 394 may perform NR wireless communication with the electronic device 101 by using the NR communication protocol stack 354 and the 5G NAS protocol 356.

According to yet another embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include, for example, a message related to at least one of security control, bearer setup, authentication, registration, or mobility management. The user data may include, for example, data excluding control messages.

According to a further embodiment, the control plane protocol and the user plane protocol may include physical (PHY), medium access control (MAC), radio link control (RLC), or packet data convergence protocol (PDCP) layers. The PHY layer may, for example, channel-code and modulate data received from a higher layer (e.g., MAC layer) and transmit the data through a radio channel, demodulate and decode data received through the radio channel, and transmit the data to the higher layer. The PHY layer included in the second communication protocol stack 316 and the NR communication protocol stack 354 may further perform an operation related to beam forming. The MAC layer may, for example, logically/physically map data to a radio channel to be transmitted/received, and perform hybrid automatic repeat request (HARQ) for error correction. The RLC layer may perform, for example, concatenation, segmentation, or reassembly of data, and order check, rearrangement, or redundancy check of data. The PDCP layer may perform, for example, operations related to ciphering and data integrity of control data and user data. The second communication protocol stack 316 and the NR communication protocol stack 354 may further include a service data adaptation protocol (SDAP). The SDAP may manage radio bearer assignment based on, for example, quality of service (QoS) of user data.

According to various embodiments, the control plane protocol may include a radio resource control (RRC) layer and a non-access stratum (NAS) layer. The RRC layer may process, for example, radio bearer setup, paging, or control data related to mobility management. The NAS may process, for example, control messages related to authentication, registration, and mobility management.

Figure 4A:
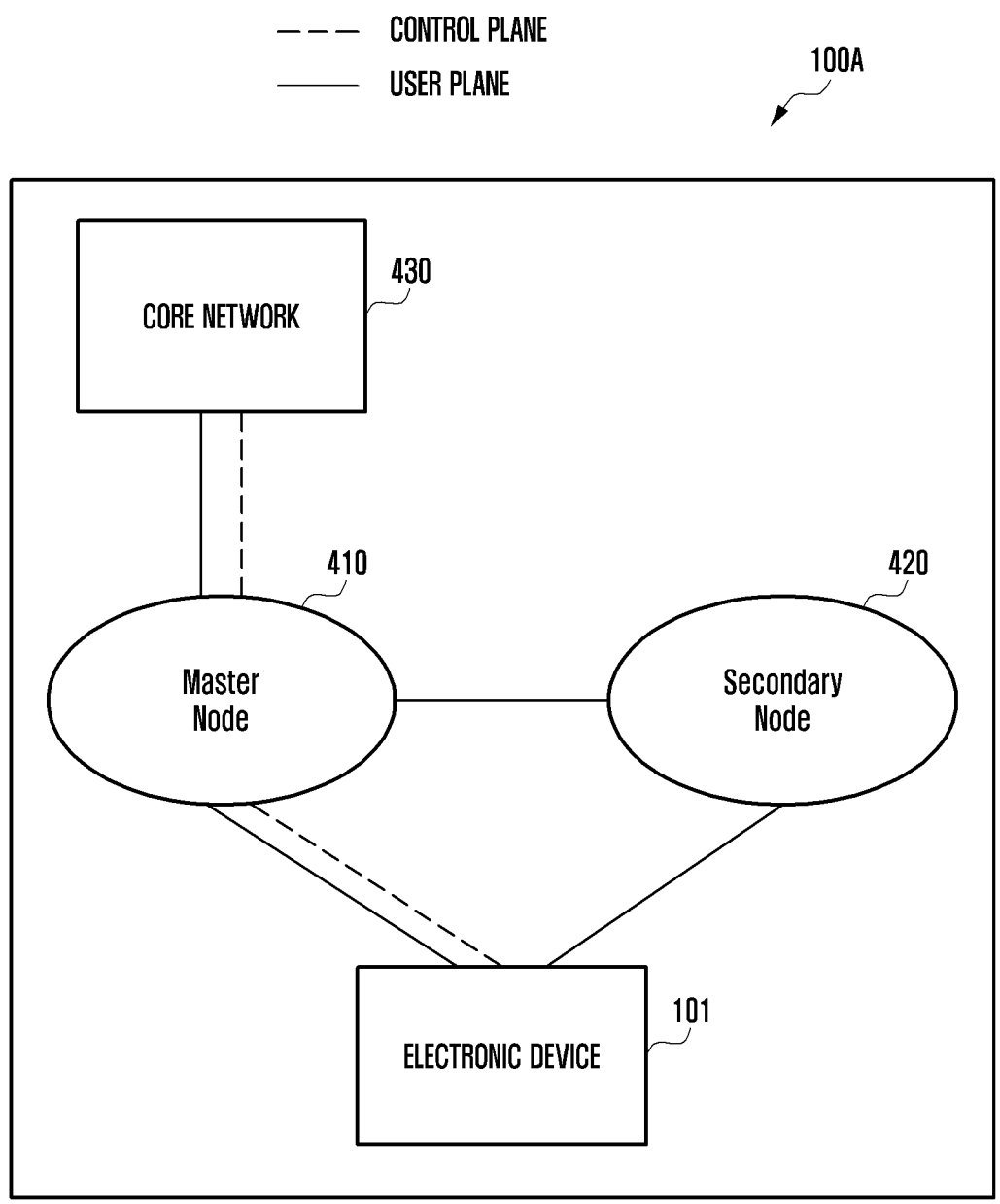
FIGS. 4A, 4B, and 4C are diagrams illustrating wireless communication systems providing a network of legacy communication and/or 5G communication according to various embodiments of the disclosure.
Figure 4B:
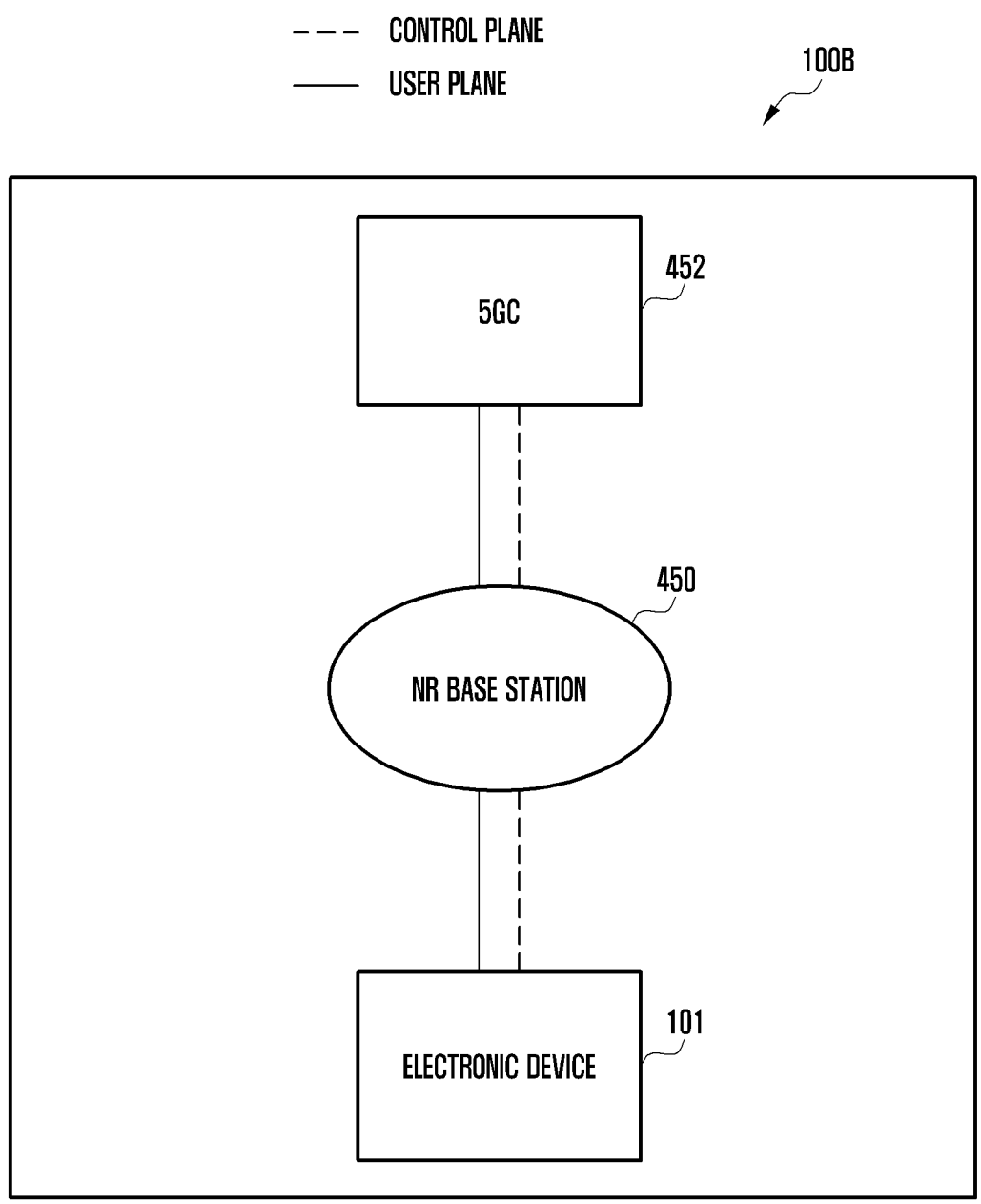
Figure 4C:
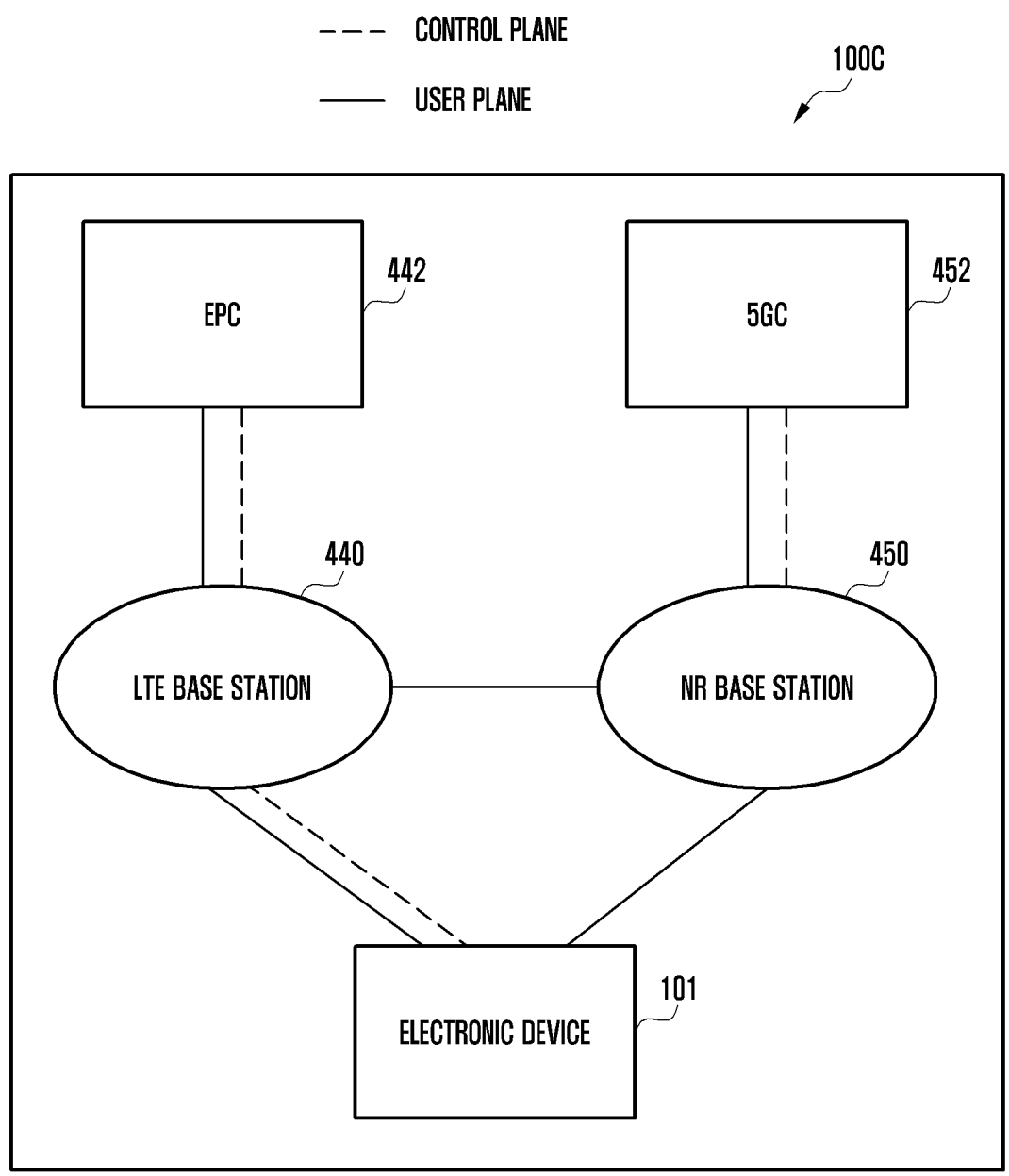

FIGS. 4A, 4B, and 4C are diagrams illustrating wireless communication systems providing a network of legacy communication and/or 5G communication according to various embodiments of the disclosure.

Referring to FIGS. 4A, 4B, and 4C, network environments 100a, 100b, and 100c may include at least one of a legacy network and a 5G network. The legacy network may include, for example, a 4G or LTE base station 440 (e.g., an eNodeB (eNB)) of the 3GPP standard supporting wireless access with the electronic device 101 and an evolved packet (EPC) 451 managing 4G communication. The 5G network may include, for example, a new radio (NR) base station 450 (e.g., a gNodeB (gNB)) supporting wireless access with the electronic device 101 and a 5th generation core (5GC) 452 managing 5G communication of the electronic device 101.

According to various embodiments, the electronic device 101 may transmit and receive a control message and user data through legacy communication and/or 5G communication. The control message may include, for example, a message related to at least one of security control, bearer setup, authentication, registration, or mobility management of the electronic device 101. The user data may refer to, for example, user data excluding control messages transmitted and received between the electronic device 101 and a core network 430 (e.g., the EPC 442 of FIG. 4C).

Referring to FIG. 4A, the electronic device 101 according to an embodiment may transmit and receive at least one of the control message or user data to and from at least a part (e.g., the NR base station 450 and the 5GC 452 in FIG. 4C) of the 5G network by using at least a part (e.g., the LTE base station 440 and the EPC 442 in FIG. 4C) of the legacy network.

According to various embodiments, the network environment 100a may provide wireless communication dual connectivity (multi-radio access technology (RAT) dual connectivity (MR-DC)) to the LTE base station 440 and the NR base station 450, and include a network environment that transmits and receives control messages to and from the electronic device 101 through the core network 430 of one of the EPC 442 and the 5GC 452.

According to various embodiments, in the MR-DC environment, one of the LTE base station 440 or the NR base station 450 may operate as a master node (MN) 410 and the other may operate as a secondary node (SN) 420. The MN 410 may be connected to the core network 430 to transmit and receive control messages. The MN 410 and the SN 420 may be connected through a network interface and transmit and receive messages related to radio resource (e.g., a communication channel) management.

According to various embodiments, the MN 410 may include the LTE base station 440, the SN 420 may include the NR base station 450, and the core network 430 may include the EPC 442. For example, control messages is transmitted and received through the LTE base station 440 and the EPC 442, and user data may be transmitted and received through the LTE base station 440 and the NR base station 450.

Referring to FIG. 4B, according to various embodiments, the 5G network may independently transmit and receive control messages and user data to and from the electronic device 101.

Referring to FIG. 4C, the legacy network and the 5G network according to various embodiments may independently provide data transmission and reception. For example, the electronic device 101 and the EPC 442 transmits and receives control messages and user data through the LTE base station 440. For another example, the electronic device 101 and the 5GC 452 may transmit and receive control messages and user data through the NR base station 450.

According to various embodiments, the electronic device 101 may be registered with at least one of the EPC 442 and the 5GC 452 to transmit and receive control messages.

According to various embodiments, the EPC 442 or the 5GC 452 may manage communication of the electronic device 101 by interworking. For example, movement information of the electronic device 101 is transmitted and received through an interface between the EPC 442 and the 5GC 452.

Figure 5:
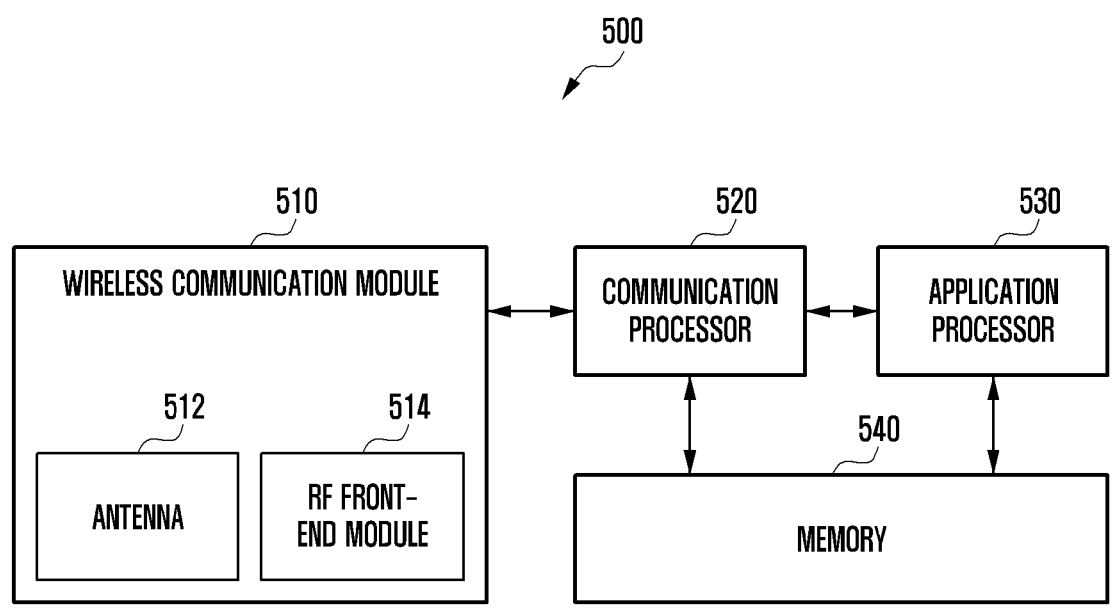
FIG. 5 is a block diagram of an electronic device according to an embodiment of the disclosure.

FIG. 5 is a block diagram of an electronic device according to an embodiment of the disclosure.

Referring to FIG. 5, an electronic device 500 may include a wireless communication module 510, a communication processor 520, an application processor 530, and a memory 540. The electronic device 500 may further include at least some of the configurations and/or functions of the electronic device 101 of FIG. 1.

According to various embodiments, the electronic device 500 may support a 5G new radio (NR) network. 5G NR may include FR (frequency) 1 band using the sub-6 GHz band and FR 2 band using the above-6 GHz band, and the electronic device 500 may support both the FR 1 band and the FR 2 band.

According to various embodiments, the wireless communication module 510 may include an antenna 512 and an RF front-end module 514. The electronic device 500 may include a plurality of antennas 512 and may be configured as an antenna array.

According to various embodiments, the electronic device 500 may use beamforming technology capable of concentrating antenna gain in a specific direction in order to compensate for propagation loss due to use of an ultra-high frequency band. The electronic device 500 may form a reception beam by using at least some of the antenna 512 and the RF front-end module 514 in multiple directions, and some circuits of the antenna element and the RF front-end module 514 capable of forming each reception beam in the wireless communication module 510 may be referred to as an RF module. The electronic device 500 may receive signals received from the 5G NR network base station in multiple directions including a plurality of RF modules directed in each direction. Module monitoring described below may refer to a process of selecting an RF module to be used for receiving a broadcasting signal (e.g., a synchronization signal block (SSB)) of a base station among several RF modules.

According to various embodiments, the memory 540 may include a volatile memory (e.g., the volatile memory 132 of FIG. 1) and a non-volatile memory (e.g., the non-volatile memory 134 of FIG. 1). According to various embodiments, the memory may include a plurality of reference values for classifying a plurality of areas within a cell to which the electronic device belongs. For example, the area within the cell to which the electronic device belongs is divided into a cell center area (or first area) and a cell outer area, and the cell outer area may be divided into handover composing area (or second area) and handover impending area (third area). The plurality of reference values stored in the memory are values corresponding to reference signal received power (RSRP) of a broadcasting signal received from a base station, and may include a first reference value serving as a reference point of the cell center area and the cell outer area, and a second reference value serving as a reference point of the handover composing area and the hand of impending area.

According to various embodiments, the memory 540 may store various instructions executable through the application processor 530 or the communication processor 520. The memory 540 may store the program 140 of FIG. 1.

According to various embodiments, the communication processor 520 may perform various operations for wireless communication on a 5G NR network. For example, the communication processor 520 supports establishment of a communication channel of a band to be used for wireless communication, modulation/demodulation of a signal, and wireless communication through the established communication channel.

According to various embodiments, the application processor 530 is a component capable of performing calculations or data processing related to control and/or communication of each component of the electronic device 500, and may include at least some of the components and/or functions of the main processor 121 of FIG. 1. Operations of the application processor 530 may be performed by loading instructions stored in the memory 540.

Hereinafter, various embodiments in which the electronic device 500 determines an RF module to perform cell monitoring (or neighbor cell measurement) for beamforming and a monitoring period will be described. Hereinafter, a control operation of the communication processor 520 will be described, but at least some of the control operations of the communication processor 520 may be performed by the application processor 530. The application processor 530 and the communication processor 520 may be included on the same chip, or some of them may be included on different chips.

According to various embodiments, the communication processor 520 may determine at least one RF module among the plurality of RF modules to monitor the second broadcasting signal transmitted from the base station and a period of the monitoring based on at least one of a plurality of reference values stored in the memory 540 and the first broadcasting signal received from the base station in the cell in which the electronic device 500 is located.

According to various embodiments, the communication processor 520 may determine an area within a cell of the electronic device 500 based on a signal received from a base station. For example, the area within the cell includes a cell center area (or a first area), which is an area within a cell center boundary of a predetermined radius from a base station of a serving cell, and a cell outer area outside the cell center area. The cell outer area may include the handover composing area (or a second area) with a lower probability of a handover event to an area within the handover boundary, and the handover impending area (or a third area) with a higher possibility of a handover event to an area outside the handover boundary. Each area defined herein does not refer to a geographical area within cell coverage, but may be an abstract area determined according to the strength of a broadcasting signal.

According to various embodiments, the communication processor 520 may configure a reference signal received power (RSRP) that may be measured from a broadcasting signal (or a first broadcasting signal) of a base station of a serving cell at the cell center boundary and the handover boundary as a reference value, and estimate the current location of the electronic device 500 by comparing the RSRP measured in the serving cell with the reference value. For example, the third reference value is a low value as a criterion for determining cell coverage. The first reference value is an RSRP measured at the cell center boundary and is higher than the third reference value, and the communication processor 520 may compare the RSRP of the signal received from the base station with the first reference value, determine that the electronic device 500 is located in the cell center area when the value is greater than or equal to the first reference value, and determine that the electronic device 500 is located in the cell outer area when the value is less than the first reference value and greater than or equal to the third reference value.

According to various embodiments, the communication processor 520 determines the monitoring period of the broadcasting signal (or the second broadcasting signal) according to whether the electronic device 500 is located in the cell center area (or the first area). For example, when the electronic device 500 is located in the cell center area where is a strong electric field area, it is expected that a good channel state of a certain level or higher will be maintained regardless of which RF module is used. Accordingly, the communication processor 520 may perform fewer module monitoring operations by increasing the module monitoring period when the electronic device 500 is located in the cell center area. In contrast, when the electronic device 500 is located in the cell outer area (the second area and the third area) that is outside the boundary of the cell center, the communication processor 520 may perform more module monitoring operations by reducing the module monitoring period.

According to various embodiments, when the electronic device 500 is located in the cell outer area, the communication processor 520 may identify whether the electronic device is located in the handover composing area (or the second area) or the handover impending area (or the third area) based on the handover boundary. The handover boundary may distinguish the possibility or frequency of handover events, and the RSRP measured at the handover boundary may be configured as the second reference value. The communication processor 520 may determine that the electronic device 500 is located in the handover composing area (or the second area) when the RSRP of the signal received from the base station is less than the first reference value and greater than or equal to the second reference value, and determine that the electronic device 500 is located in the handover impending area (or the third area) when the RSRP of the signal received from the base station is less than the second reference value.

According to various embodiments, when it is determined that the electronic device 500 is located in the handover composing area, the communication processor 520 may perform cell monitoring by using a serving module that forms a reception beam for a serving cell among a plurality of RF modules. Since the handover composing area is an area where handover events are expected to occur relatively little, neighbor cell monitoring may be performed by using only a serving module currently monitoring a broadcasting signal of a serving cell base station among the plurality of RF modules to reduce the use of the SMTC section for neighbor cell measurement.

According to various embodiments, when it is determined that the electronic device 500 is located in the handover impending area, the communication processor 520 may perform cell monitoring by using both the serving module and the non-serving module. Since the handover impending area is an area where a handover event may easily occur because the electric field of the neighbor cell does not have a large difference from that of the serving cell, the communication processor 520 may monitor the neighbor cell by using both the serving module and the non-serving module to secure an accurate channel condition of the neighbor cell.

According to various embodiments, the communication processor 520 may adjust the first reference value corresponding to the cell center boundary and the second reference value corresponding to the handover boundary based on the moving speed of the electronic device 500. For example, when the electronic device 500 moves at a high speed, the first reference value and the second reference value are increased, and accordingly, the size of the cell center area may be decreased, and the size of the cell outer area may be increased. Accordingly, in preparation for rapid channel change during high-speed movement, frequency and accuracy of module monitoring and neighbor cell measurement may be increased.

According to various embodiments, when at least some of the plurality of RF modules are blocked, the communication processor 520 may perform the cell monitoring by using at least some of the RF modules excluding the blocked RF modules.

Hereinafter, the content to be described with reference to FIGS. 6 to 9 may be comparative examples of various embodiments disclosed in the disclosure.

Figure 6:
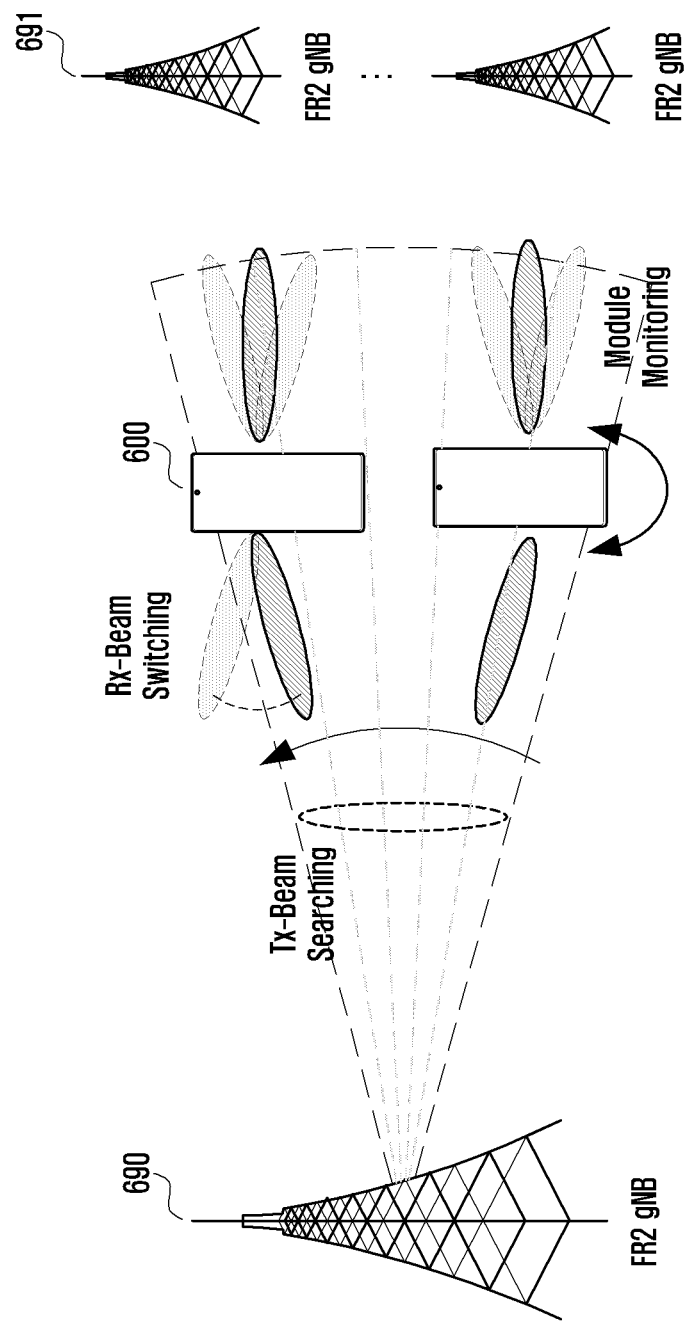
FIG. 6 illustrates a method for an electronic device to measure SSBs of neighbor cells according to an embodiment of the disclosure.

FIG. 6 illustrates a method for an electronic device to measure broadcasting signals (e.g., SSBs) of neighbor cells according to an embodiment of the disclosure.

According to various embodiments, the electronic device 600 may support 5G NR mobile communication. The 5G NR mobile communication may be divided into FR 1 band using the sub-6 GHz band and FR 2 band using the above-6 GHz band. In the ultra-high frequency FR 2 band, because the straightness of the radio wave is very large and the coverage is weak, the electronic device 600 and the base station of the 5G NR network may use beamforming technology to overcome the characteristics of the FR 2 band. In the case of the FR 2 band, the number of synchronization signal block (SSB) (or SS synchronization signal/physical broadcast channel (PBCH) block) used in the network is relatively large compared to the FR 1 band, and the electronic device 600 may also operate various RF modules and Rx beams.

According to various embodiments, the electronic device 600 may receive limited SSB resources from the network for SSB measurement. For example, an SSB period of the serving cell and an SS/PBCH block measurement time configuration (SMTC) period for SSB measurement of a neighbor cell is allocated according to a network configuration.

According to various embodiments, the electronic device 600 may repeatedly perform measurement using several RF modules and Rx beams for a given SSB resource in order to reflect the influence of a channel according to a specific direction generated by beamforming.

Referring to FIG. 6, an electronic device 600 may search for SSBs transmitted from a base station 690 of the serving cell and a base station 691 of a neighbor cell in various directions with respect to the electronic device 600, and may use Rx beam switching for this purpose. For example, the electronic device 600 forms an Rx beam in a specific direction through a plurality of RF modules, and switch the direction of the Rx beam by changing the RF module performing monitoring according to a specific period. In addition, the base station 690 of the serving cell may perform Tx beam switching to form a Tx beam in the direction in which the electronic device 600 is located.

According to various embodiments, in the case of the FR 2 band, the number of SSBs, RF modules, and Rx beams is greater than that of the FR 1 band, so measurement time may take a long time due to overhead caused by repeated SSB measurement. For this reason, it may be necessary to specify and simplify a measurement target to improve the efficiency of SSB measurement.

Figure 7:
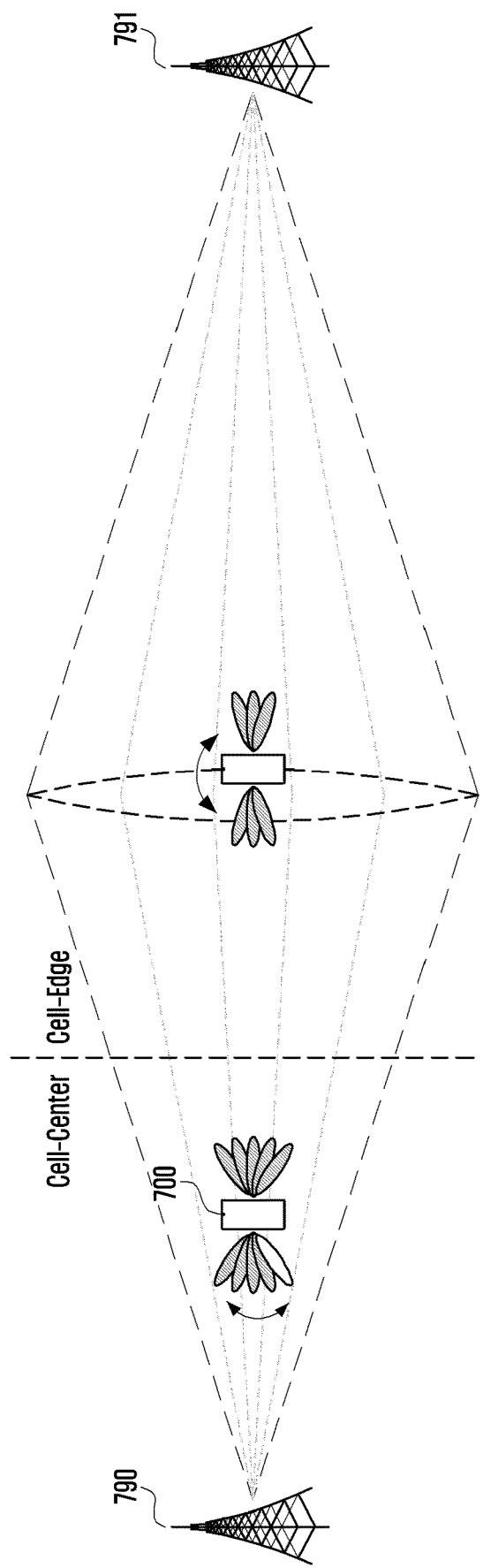
FIG. 7 illustrates an example of a location of an electronic device in a cell according to an embodiment of the disclosure.

FIG. 7 illustrates an example of a location of an electronic device in a cell according to an embodiment of the disclosure.

FIG. 7 illustrates a case in which electronic devices are respectively located in a serving cell center area (or a first area) of and a serving cell outer area.

According to various embodiments, an electronic device 700 may have different purposes and objects for performing SSB measurement according to areas located within the cell. For example, the electronic device 700 performs SSB measurement on a neighbor cell in order to search for the neighbor cell in the cell outer area far from a serving cell base station 790. Since the base stations of the mobile communication network are arranged at regular intervals in a form in which shadow areas are minimized, in many cases, incident directions of signals of the serving cell base station 790 and a neighboring base station 791 are opposed to each other based on the electronic device 700. The electronic device 700 may measure signals incident from each direction (e.g., left and right) by different RF modules, and differences in SSB measurement results for neighbor cells may occur depending on the RF module that performs the measurement. This may affect handover operation based on channel measurement.

When the electronic device 700 is located in the cell center area close to the serving cell base station 790, performing SSB measurement on the serving cell may be important for channel estimation of the serving cell. For example, when the electronic device 700 is located in the cell center area, because the electronic device is located in the strong electric field of the serving cell, a need for monitoring of an RF module (or a non-serving module) not currently performing SSB measurement is relatively low except for a sudden change in channel state of the serving cell.

In this way, in order to improve SSB measurement efficiency and handover performance according to the location of the electronic device 700 within the cell, it may be necessary to control additional monitoring and measurement targets of the non-serving module.

Figure 8:
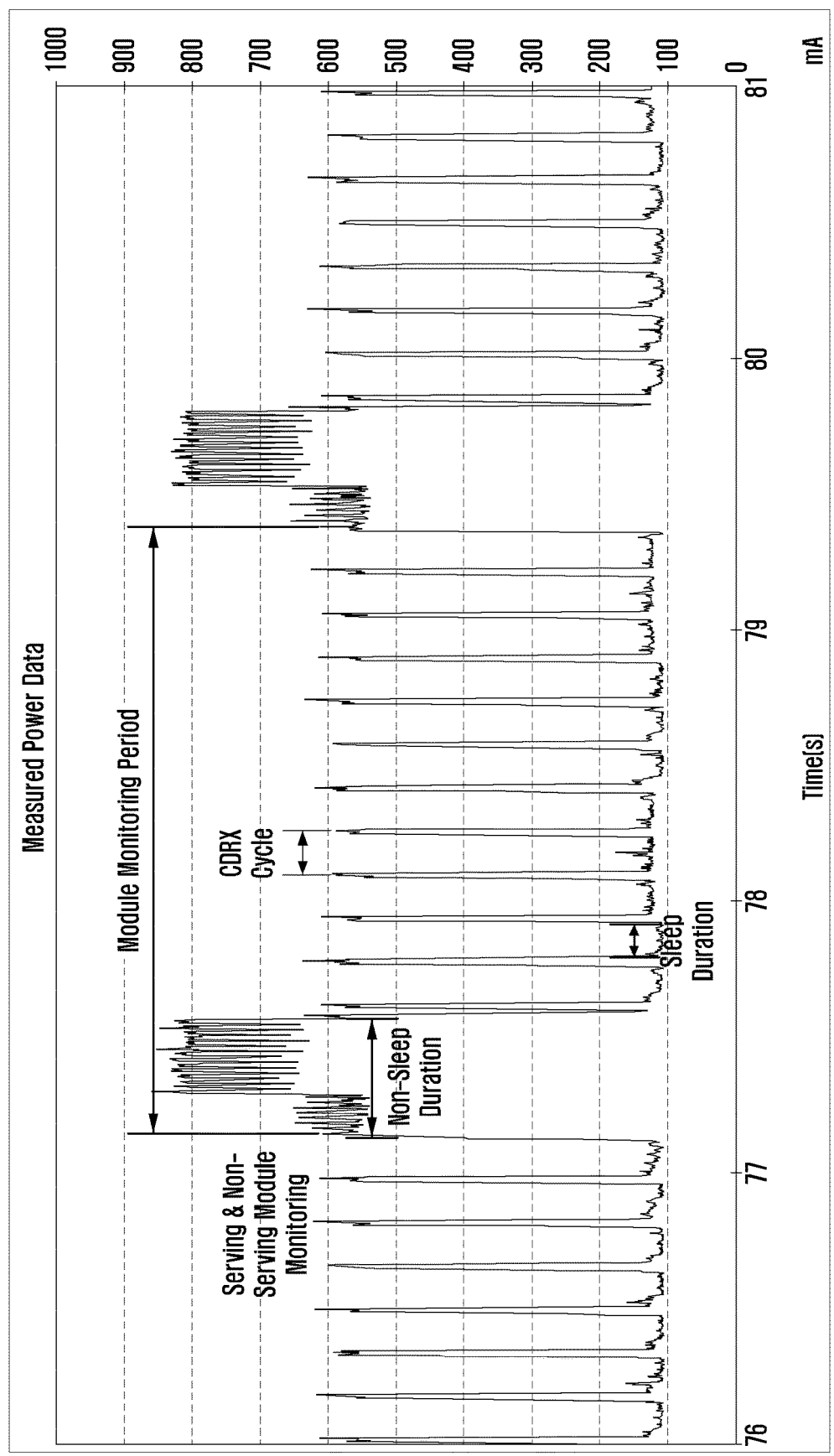
FIG. 8 illustrates current consumption in a CDRX operation by an electronic device according to an embodiment of the disclosure.

FIG. 8 illustrates current consumption in a CDRX operation by an electronic device according to an embodiment of the disclosure.

According to various embodiments, the electronic device may operate in the connected mode discontinuous reception (CDRX) mode. The CDRX is a technology that periodically switches to a sleep state (or low power mode) in a data connection state to reduce power consumption. Referring to FIG. 8, the electronic device may wake up according to a predetermined CDRX period, and consume a low current of about 100 mA in the sleep state and a high current of about 600 mA in the wake-up state.

When the electronic device communicates with a 5G NR network in the FR 2 band, the SSB transmission period and SMTC period are short, and SSB measurements must be repeatedly performed through a plurality of Rx beams and RF modules, and considering the processing time required for sleep/wake-up of the electronic device, an active time section with high power consumption may be extended during the monitoring operation of the RF module. For example, the wake-up (or non-sleep) section due to the RF module monitoring operation is very long compared to a DRX on section. Referring to FIG. 8, in a module monitoring period, the non-sleep section may be longer than the sleep section. As described above, when the wake-up section frequently occurs when the CDRX is applied, current consumption may increase. In order to minimize the current consumption, the electronic device needs to selectively perform monitoring of the non-serving module when necessary, thereby reducing the SSB measurement time and reducing the length of the non-sleep section.

According to various embodiments, the electronic device may determine the monitoring period of the broadcasting signal according to the area (e.g., the area 1, the area 2, and the area 3) within the cell determined based on the comparison between the broadcasting signal of the serving cell and the reference value (e.g., the 1st reference value and the 2nd reference value) during the CDRX operation, and determine activation and deactivation timing of monitoring of the broadcasting signal of the RF module according to the determined period.

Figure 9:
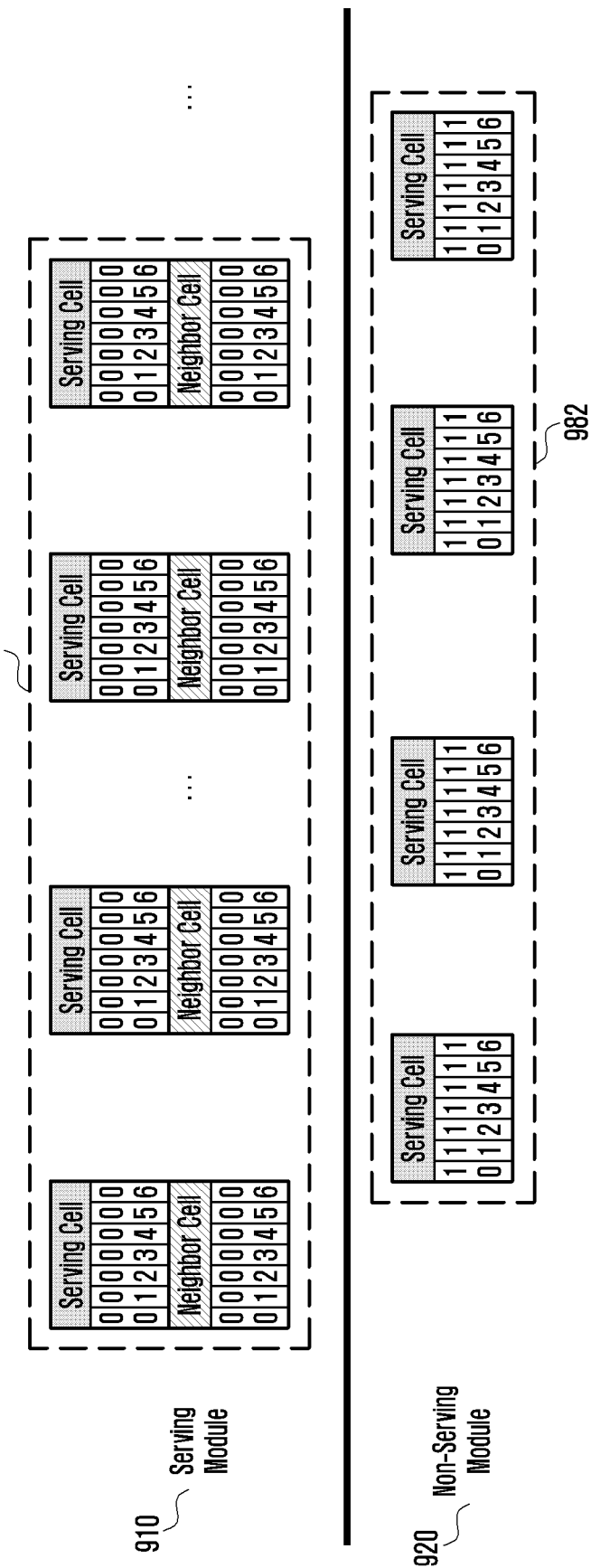
FIG. 9 illustrates an example of a cell search period of each RF module of an electronic device according to an embodiment of the disclosure.

FIG. 9 illustrates an example of a cell search period of each RF module of an electronic device according to an embodiment of the disclosure.

FIG. 9, as in the embodiments of FIGS. 6 to 8, illustrates a monitoring schedule when an electronic device uses a fixed module monitoring period and performs a radio resource management (RRM) operation for neighbor cell measurement in a fixed manner in a serving module 910.

Referring to FIG. 9, among a plurality of RF modules of the electronic device, RF module #0 may operate as the serving module 910 and RF module #1 may operate as a non-serving module 920. In one period, the serving module 910 (#0) may sequentially form beams 0 to 6 through beam sweeping to receive a signal, and in this case, receive signals of both the serving cell and the neighbor cell. The non-serving module 920 (#1) may sequentially form beams 0 to 6 through beam sweeping to receive a signal, and in this case, receive only the signal of the serving cell.

Referring to FIG. 9, after a cell monitoring operation 981 of the serving module, a cell monitoring operation 982 of the non-serving module may be alternately performed, and as illustrated, the serving module and the non-serving module may perform cell monitoring at the same period.

In the disclosure, an operation for measuring a neighbor cell is performed only in the serving module 910, and the operating periods of the serving module 910 and the non-serving module 920 may be the same. According to another embodiment, the electronic device may monitor a broadcasting signal by using only the serving module 910, and in this case, the non-serving module 920 may remain in an inactive state without monitoring.

In FIG. 9, the index of the RF module (e.g., the serving module 0 and the non-serving module 1) and the index of the beam (e.g., 0-6) during the beam sweeping have been described as a separate set, but according to another embodiment, the indices of the RF module and the beam may be defined as one. For example, the beam indices of the serving module 910 may be defined as 0, 1, 2, 3, 4, 5, and 6, and the beam indices of the non-serving module 920 is defined as 7, 8, 9, A, B, C, and D.

Figure 10:
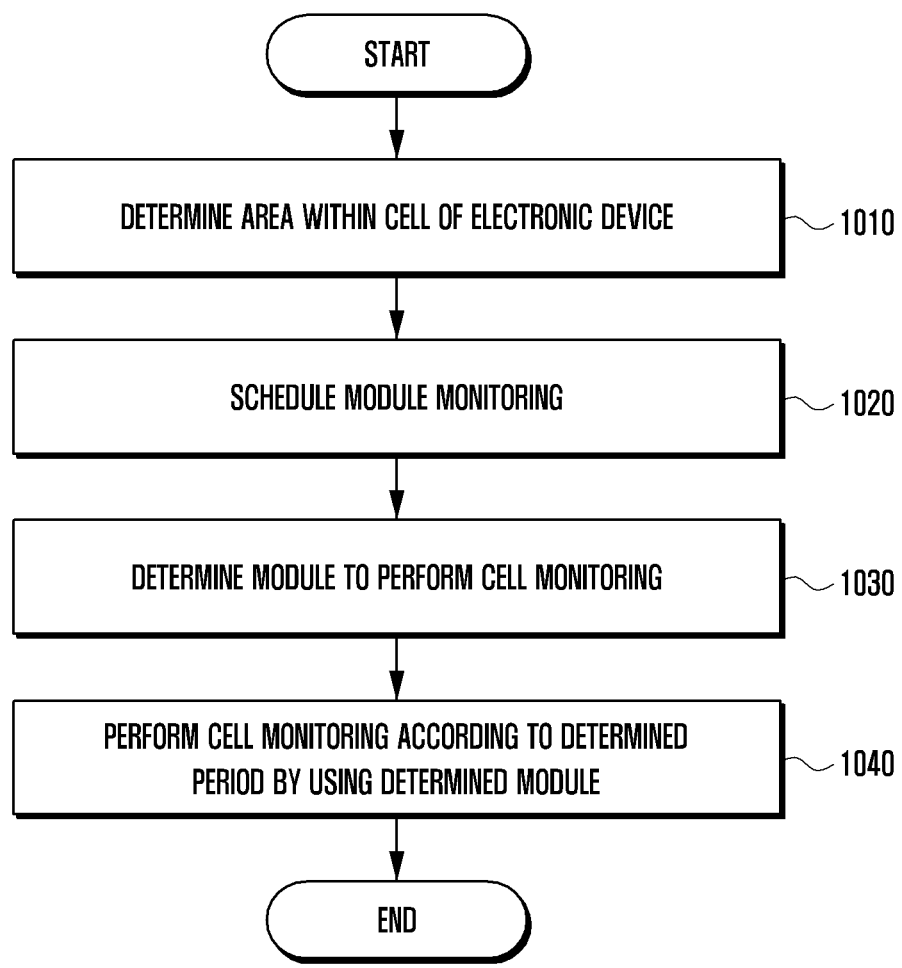
FIG. 10 is a flowchart of a method for selecting an RF module for beamforming of an electronic device according to an embodiment of the disclosure.

FIG. 10 is a flowchart of a method for selecting an RF module for beamforming of an electronic device according to an embodiment of the disclosure.

The illustrated method may be performed by the electronic device described with reference to FIGS. 1 to 3, 4A to 4C, and 5.

Referring to FIG. 10, in operation 1010, the electronic device may determine an area (e.g., a first area, a second area, or a third area) within a cell of the electronic device. The electronic device may determine the cell coverage and the cell area for controlling the SBB measurement considering a cell arrangement of the 5G NR network and a handover event occurrence condition.

According to various embodiments, in order to determine the cell coverage covered by each base station considering the distribution of base stations in the 5G NR network, the electronic device may configure a reference signal received power (RSRP) reference value (e.g., a third reference value) for determining the cell coverage.

According to various embodiments, the electronic device may determine an RSRP reference value (e.g., a first reference value) of a cell center boundary for distinguishing an area in which non-serving module monitoring is preferred based on the cell coverage, and an RSRP reference value (e.g., a second reference value) of a handover boundary for distinguishing a handover composing area (or the second area) and the handover impending area (or the third area).

For example, the second reference value is a value measured when located at the cell center boundary, and when the RSRP value measured from the serving cell in the electronic device is greater than or equal to the first reference value, it is determined that the electronic device is located in the cell center area (or the first area). In addition, the second reference value is a value measured when located at the handover boundary, and when the RSRP value measured from the serving cell in the electronic device is less than the first reference value and greater than or equal to the second reference value, it is determined that the electronic device is located in the handover composing area (or the second area), and when the measured RSRP value is less than the second reference value, it may be determined that the electronic device is located in the handover impending area (or the third area).

A method for determining an area within the cell by the electronic device will be described in more detail with reference to FIGS. 11A and 11B.

According to various embodiments, in operation 1020, the electronic device may schedule monitoring of a broadcasting signal transmitted from the base station. After determining the area within the cell of the electronic device, the electronic device may perform the scheduling for determining a module monitoring period. The electronic device may determine the module monitoring period according to the cell area in which the electronic device is located based on the RSRP reference value (the first reference value and $RSRP_{CellCenterBoundary}$) of the cell center area, and schedule the monitoring execution timing.

For example, when it is determined that the electronic device is located in the cell center area, the electronic device selects a rare module monitoring policy that increases a module monitoring period in order to reduce module monitoring. The cell center area is a strong electric field area of the serving cell, and a good channel state may be maintained even when any RF module among a plurality of RF modules of the electronic device is used. Therefore, as long as the posture of the electronic device does not significantly change, because the probability that the channel environment is significantly deteriorated is low, the electronic device may increase the module monitoring period by selecting a rare module monitoring policy in the cell center area. Accordingly, the electronic device may perform a small number of module monitoring operations to reduce a section in which the current consumption is large during the CDRX operation.

For example, when it is determined that the electronic device is located in a cell outer area that is outside a cell center, the electronic device selects a frequent module monitoring policy that reduces a module monitoring period in order to monitor a lot of modules. Since the cell outer area is a weak electric field area of the serving cell, as opposed to the cell center area, the operation frequency of module monitoring may be increased to find a better channel environment.

According to various embodiments, in operation 1030, the electronic device may determine an RF module to monitor the broadcasting signal. The electronic device may perform a measurement target control to perform monitoring after selecting a period of module monitoring or at least partially at the same time. The electronic device may determine an execution period for neighbor cell measurement and an RF module to perform the measurement based on the synchronization signal block (SSB) configured in the network, configuration of SSB measurement time configuration (SMTC), and the area where the electronic device is located.

According to various embodiments, the electronic device may schedule neighbor cell measurement timing by determining a period of neighbor cell measurement, which is an RRM operation required for handover depending on the cell area where the electronic device is located, based on the RSRP reference value of the handover boundary, and the RF module to perform the neighbor cell measurement.

For example, the handover impending area (or the third area) outside the handover boundary is an area in which a handover event may easily occur because the electric field of a neighbor cell is similar to that of the serving cell within a certain range, and as a result, a better serving cell is selected only when an accurate channel condition of the neighbor cell is obtained quickly. Therefore, when the electronic device is located in the handover impending area, the electronic device may select a dual module based neighbor cell measurement policy and measure the neighbor cell by using two RF modules. In this case, the electronic device may perform cell measurement by using both the serving module that forms a beam toward the current serving cell and the non-serving module that forms a beam toward the neighbor cell, that is, in a direction opposite to that of the serving cell.

For example, when the electronic device is located in the handover composing area (or the second area) inside the handover boundary, the electronic device selects a single module based neighbor cell measurement policy and measure the neighbor cell by using only one RF module (the serving module). In the case of the handover composition area, because the occurrence of handover events is relatively small, the electronic device may perform neighbor cell measurement by using only the serving module to reduce the use of an SMTC section for neighbor cell measurement.

According to various embodiments, in operation 1040, the electronic device may perform a cell monitoring based on the scheduling determined in operation 1020 by using the RF module determined in operation 1030.

Figure 11A:
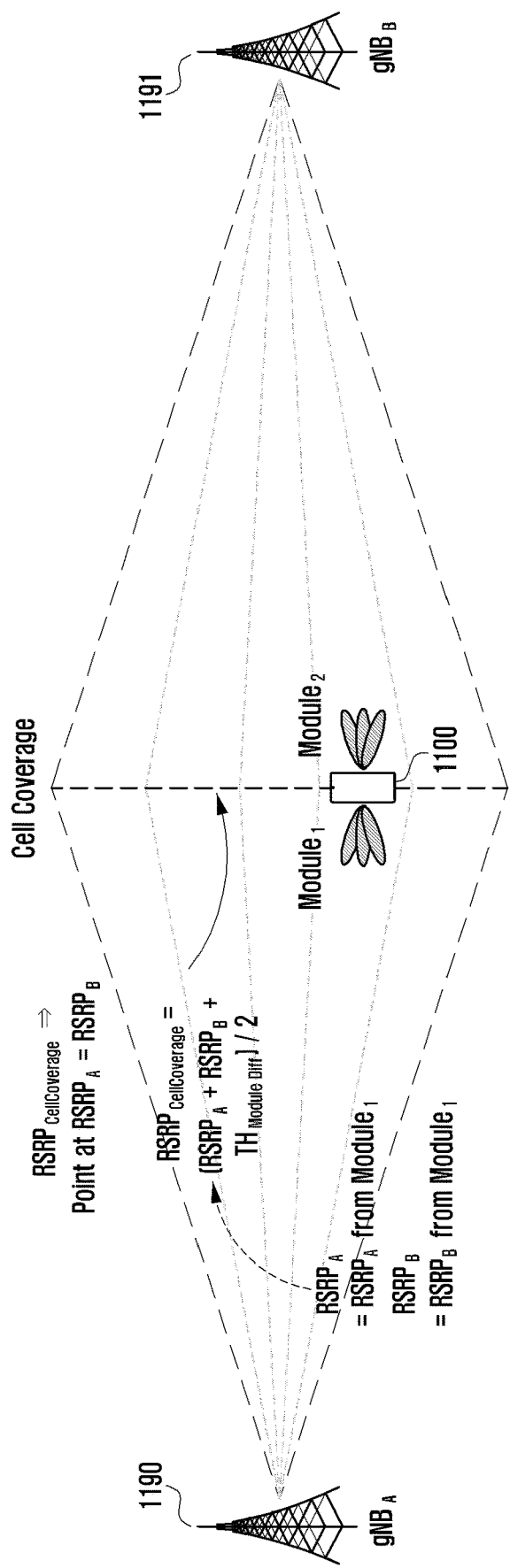
FIGS. 11A and 11B illustrate locations of electronic devices in cells according to various embodiments of the disclosure.
Figure 11B:
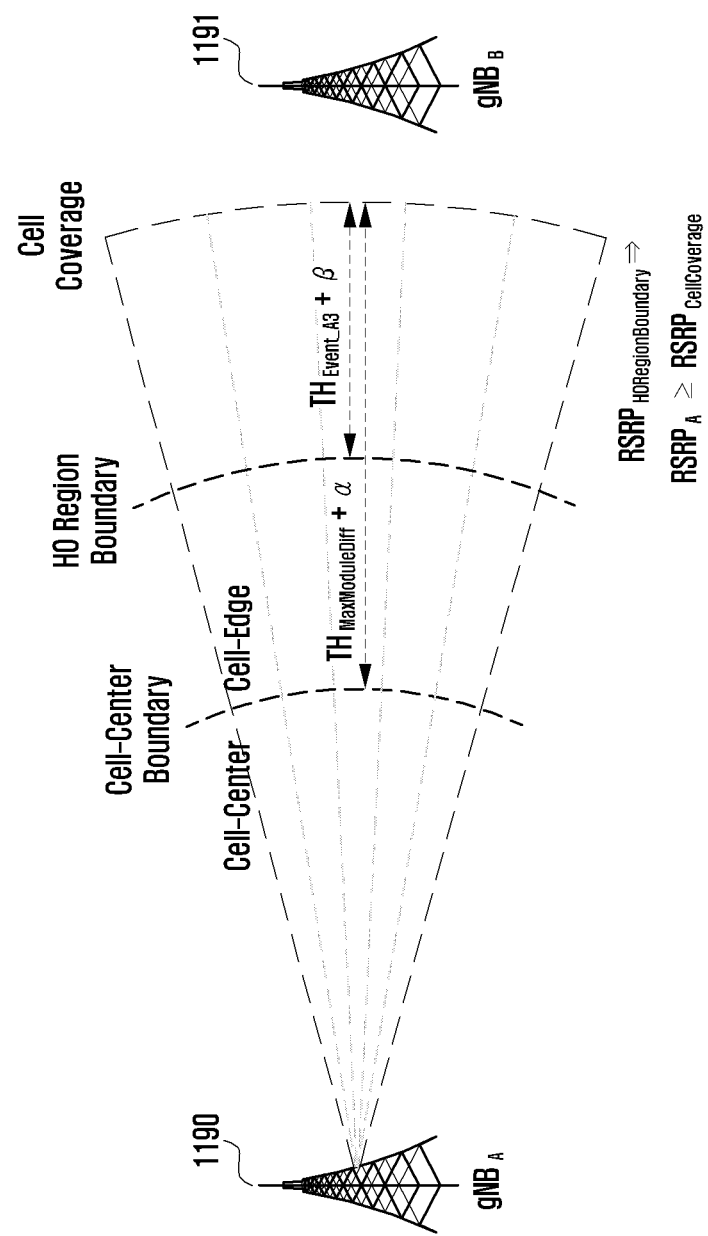

FIGS. 11A and 11B illustrate a method of determining an area within a cell of an electronic device according to various embodiments of the disclosure.

Referring to FIG. 11A, an electronic device 1100 may be located adjacent to a first base station (gNB$_A$) 1190 and a second base station (gNB$_B$) 1191 of a 5G NR network, and transmit and receive signals through a plurality of RF modules. According to various embodiments, the electronic device 1100 may configure a reference signal received power (RSRP) reference value (e.g., the third reference value) for determining cell coverage in order to determine cell coverage covered by each base station considering distribution of base stations.

According to various embodiments, in the case of a single cell environment, the electronic device 1100 may configure an RSRP value for determining cell coverage to a predetermined value.

According to various embodiments, in the case of a multi-cell environment, because the cell coverage is affected by the distribution of neighbor base stations, the electronic device 1100 may determine the RSRP reference value considering the maximum RSRP values of the serving cell and the neighbor cell. Referring to FIG. 11A, the cell coverage may be determined as an area in which the RSRP of a signal of the first base station and the RSRP of a signal of the second base station are the same.

According to another embodiment, the electronic device 1100 may estimate the RSRP of the neighbor cell measured by the non-serving module in the form of correcting a possible RSRP difference between RF modules in the RSRP of the neighbor cell measured by the serving module to reflect the RSRP of the neighbor cell received from the opposite direction.

For example, the RSRP reference value of cell coverage may be calculated according to Equation 1 below.

$$RSRP_{CellCoverage\_MultiCell} = (RSRP_{ServCell} + RSRP_{NeighCell} + TH_{MaxModuleDiff})/2 \qquad \text{Equation 1}$$

In Equation 1, $RSRP_{CellCoverage\_Multicell}$ may be the third reference value that is the basis for cell coverage in the multi-cell environment, $RSRP_{ServCell}$ may be the RSRP of the broadcasting signal of the serving cell, $RSRP_{NeighCell}$ may be the RSRP of the broadcasting signal of the neighbor cell, and $TH_{MaxModuleDiff}$ may be the maximum value of the difference in RSRP of the broadcasting signal that may be measured in each RF module.

According to various embodiments, after calculating the RSRP reference value (e.g., the third reference value) for determining the cell coverage, the electronic device 1100 may determine the first reference value for determining a cell center boundary and the second reference value for determining a handover boundary. Referring to FIG. 11B, the cell center boundary may be closer to the serving cell base station, and the handover boundary may be farther than the cell center boundary.

Here, the cell center boundary may be a criterion for determining whether to monitor the non-serving module, and the handover boundary may be a criterion for distinguishing the handover impending area (or the third area) in which neighbor cell measurement is important for handover.

According to yet another embodiment, in order to classify an area where module monitoring is preferred, the electronic device 1100 may classify the area based on a difference in signal strength between the serving cell and the neighbor cell and a possible RSRP difference between RF modules of the electronic device 1100.

According to a further embodiment, the electronic device 1100 may configure the handover impending area with a high probability of occurrence of handover to an area other than a predetermined threshold value at the cell boundary. The corresponding threshold value may be configured as an A3 event value, which is a threshold value configured in the network for handover event occurrence.

For example, the first reference value and the second reference value may be calculated according to Equation 2 below.

$$RSRP_{CellCenterBoundary} = RSRP_{CellCoverage} + TH_{MaxModuleDiff} + \alpha$$

$$RSRP_{HORegionBoundary} = RSRP_{CellCoverage} + TH_{EventA3Threshold} + \beta \qquad \text{Equation 2}$$

In Equation 2 above, $RSRP_{CellCoverage}$ may be the third reference value for determining cell coverage, $TH_{MaxModuleDiff}$ may be the maximum value of the difference in RSRP of the broadcasting signal that may be measured in each RF module, $TH_{EventA3Threshold}$ may be the A3 event value, which is a threshold configured in the network for handover event occurrence, and $\alpha$ and $\beta$ may be values for correcting each reference value according to the network environment and/or the state of the electronic device.

Figure 12A:
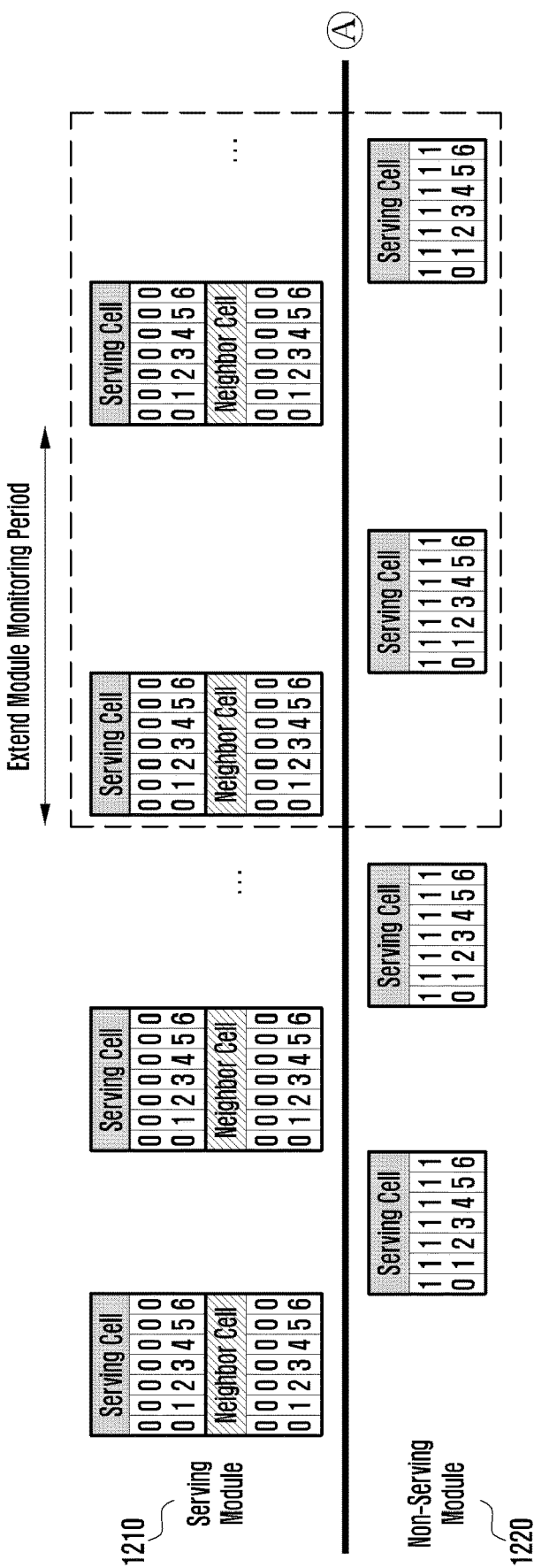
FIGS. 12A, 12B, and 12C illustrate a cell search period of each RF module of an electronic device according to various embodiments of the disclosure.
Figure 12B:
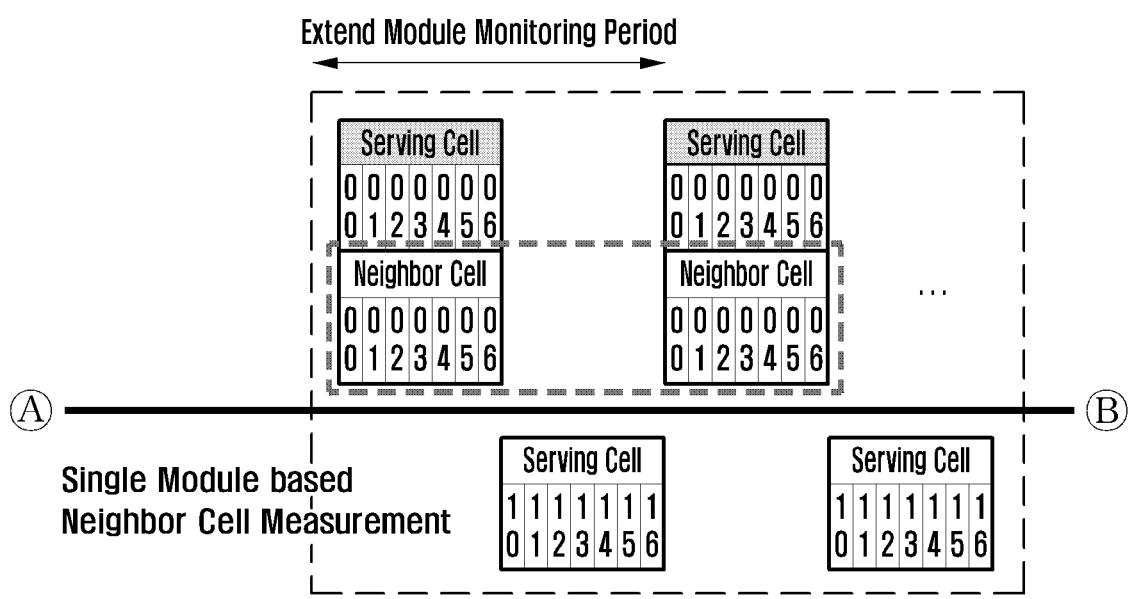
Figure 12C:
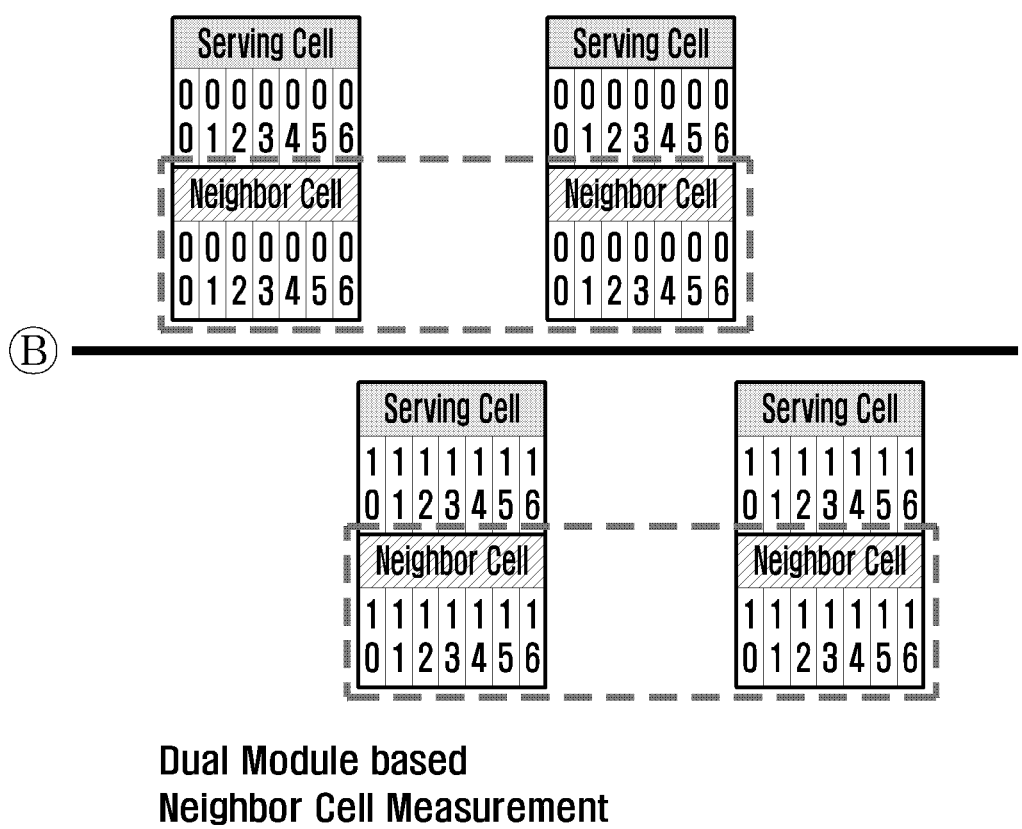

FIGS. 12A, 12B, and 12C illustrate a cell search period of each RF module of an electronic device according to various embodiments of the disclosure.

Referring to FIGS. 12A, 12B, and 12C, among a plurality of RF modules of the electronic device, RF module #0 may operate as the serving module 1210 and RF module #1 may operate as a non-serving module 1220. In one period, the serving module 1210 (#0) may sequentially form beams 0 to 6 through beam sweeping to receive a signal, and in this case, receive signals of both the serving cell and the neighbor cell. The non-serving module 1220 (#1) may sequentially form beams 0 to 6 through beam sweeping to receive a signal, and in this case, receive only the signal of the serving cell.

According to various embodiments, the electronic device may increase the module monitoring period when the electronic device is located in the cell center area. The electronic device may determine that the electronic device is located in the cell center area when the measured RSRP value is higher than the first reference value, and in this case, as illustrated in FIG. 12A, the electronic device may sequentially perform the operation of the serving module 1210 and the operation of the non-serving module 1220, and then has a predetermined sleep section, and then sequentially perform the operation of the serving module 1210 and the operation of the non-serving module 1220 again. Through this, the activation time of the modem due to the module monitoring may be reduced, and current consumption may be reduced by maximally securing a period maintained in a sleep state during the CDRX operation.

According to various embodiments, the electronic device may decrease the module monitoring period again when the electronic device is located in the cell outer area. Referring to FIG. 12B, when the electronic device is located in the cell outer area, the electronic device may increase the frequency of performing module monitoring to find signals received from other incident directions that may have a good channel environment by reducing the module monitoring period.

Referring to FIG. 12B, the electronic device is located in the cell composing area (or the second area) within a handover boundary among cell outer areas, and in this case, the electronic device may search for a neighbor cell by using only the serving module 1210.

Referring to FIG. 12C, the electronic device moves further outside the cell and is located in the cell impending area (or the third area) outside the handover boundary, and in this case, the electronic device may search for a neighbor cell by using both the serving module 1210 and the non-serving module 1220. Accordingly, it is possible to detect the occurrence of a handover event more quickly and improve detection accuracy.

Figure 13:
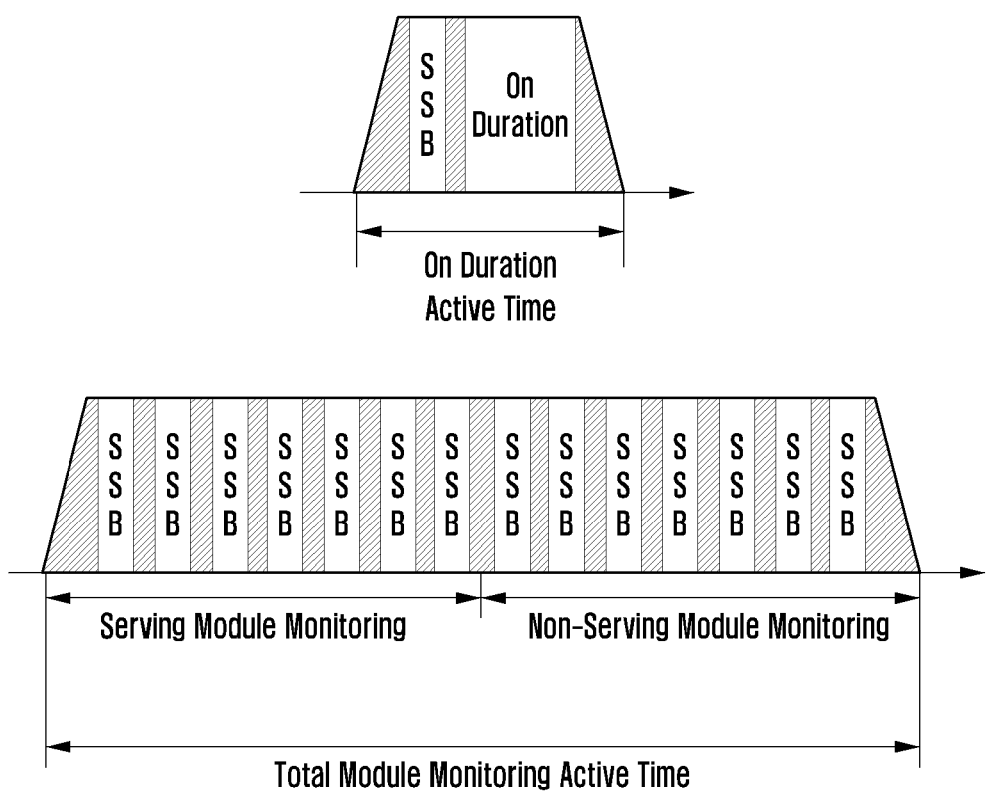
FIG. 13 illustrates SSB reception timing of an electronic device according to an embodiment of the disclosure.

FIG. 13 illustrates SSB reception timing of an electronic device according to an embodiment of the disclosure.

According to various embodiments, the electronic device may calculate an active time ratio according to the operation of the electronic device when parameters such as SSB, SMTC, and DRX are configured from the network. Table 1 below is an example of network configuration parameters.

TABLE 1

| SSB | ssb-periodicityServingCell: ms 20 (2) |
| | ssbSubcarrierSpacing: kHz 240 |
| SMTC | periodicityAndOffset: sf20 |
| | duration: sf3 |
| DRX | drx-onDurationTimer: ms 8 |
| | drx-inactivityTimer: ms 8 |
| | drx-LongCycleStartOffset: ms 160 |

For example, as illustrated in FIGS. 12A, 12B, and 12C, the electronic device forms two RF modules and seven Rx beams for each module, and performs full-sweeping on all modules and Rx beams during module monitoring. In this case, the default module monitoring period is 960 ms and the processing time required for the electronic device to wake up and sleep is 10 ms, and when it is assumed that the electronic device cannot wake up and sleep within the ssb-periodicity due to a time margin, the operating time and module monitoring time of the electronic device may be calculated as in Equations 3 and 4, respectively.

On Duration: SSB Duration (3 ms)+On Duration (8 ms)+Processing (10 ms)=Total 21 ms    Equation 3

Module Monitoring: 14(Rx-beam)*SSB period (20 ms)−non-usage (17 ms)+Processing (10 ms)=Total 273 ms    Equation 4

In the calculation process, the electronic device is activated for PDCCH decoding in the DRX on duration section, and in this case, it may be considered that a synchronization signal is secured through reception of the nearest immediately preceding SSB to improve PDCCH decoding performance. In addition, the electronic device sweeps the entire RF module and Rx beam, and in this case, due to limitations of the electronic device, it may be considered that sleep may not be entered in the middle of the SSB burst period.

FIG. 13 illustrates an example of an activation time of an electronic device operated by the above calculation.

When the module monitoring period is increased in the cell center area through this calculation, the activation time ratio may be estimated as follows.

Active 6 times per 1 module monitoring period for on duration operation (21*6=126 ms)

When maintaining the default module monitoring period: (273+126−21)/960=39.3%

When the default module monitoring period doubles: (273+126−21+126)/(960*2)=26.2%

When the default module monitoring period is increased by 3 times: (273+126−21+126+126)/(960*3)=21.8%

Figure 14:
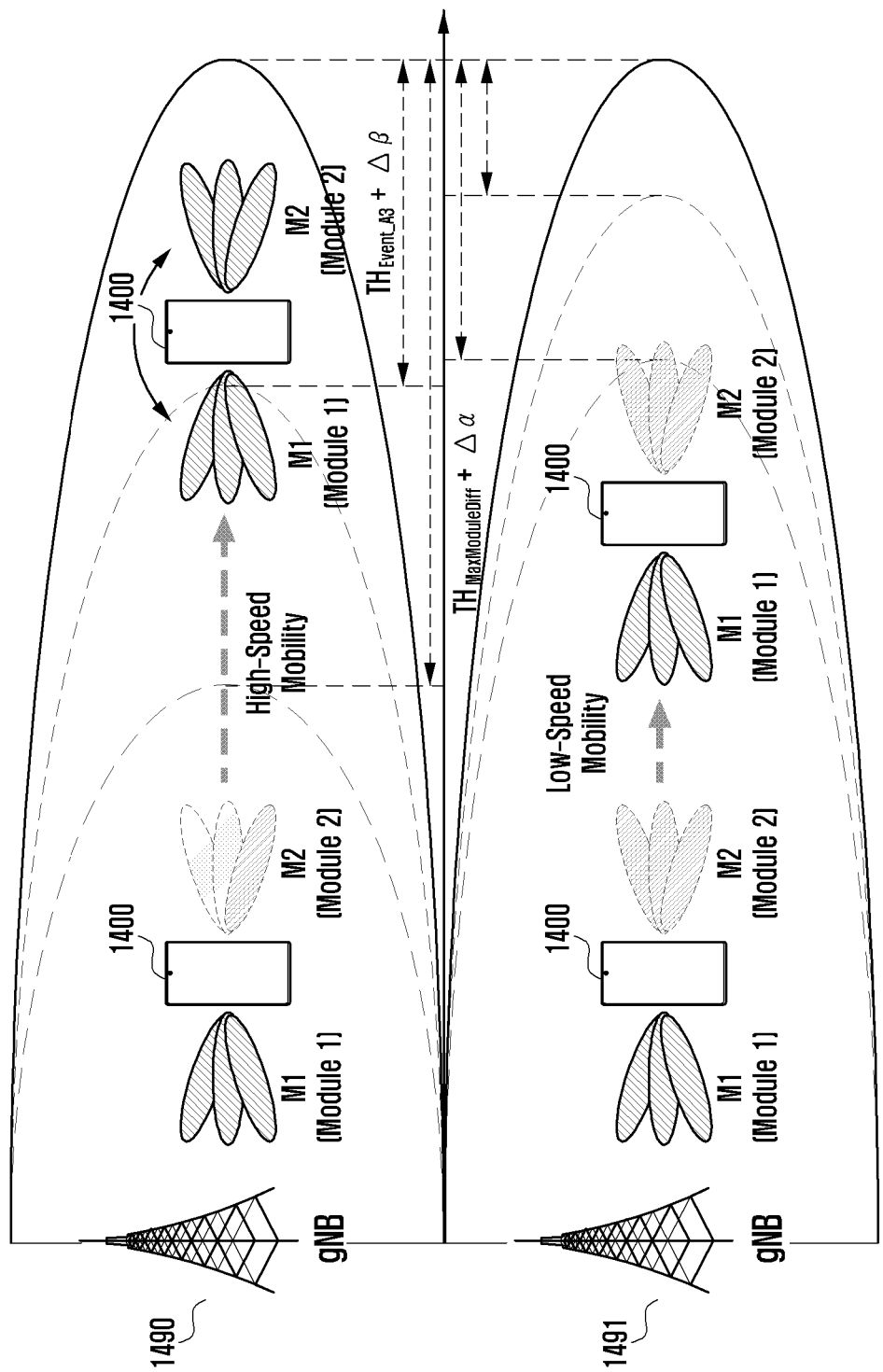
FIG. 14 illustrates a measurement area update method of an electronic device according to an embodiment of the disclosure.

FIG. 14 illustrates a measurement area update method of an electronic device according to an embodiment of the disclosure.

According to various embodiments, an electronic device 1400 may differentially configure the measurement area according to the moving speed of the electronic device 1400 by updating parameters (e.g., a first reference value, a second reference value, and a third reference value) to determine boundaries such as cell center boundaries, handover boundaries, and cell coverage considering the mobility of the electronic device 1400.

Referring to FIG. 14, when the electronic device 1400 moves at a high speed, it may be identified that the cell center boundary and the handover boundary are further extended from a base station 1490 than when the electronic device 1400 moves at a low speed. According to another embodiment, the RSRP reference value (e.g., the second reference value) of the handover boundary may be calculated as the sum of a predetermined reference value ($TH_{EV\_ENT\_A3}$) and a correction value ($\Delta\beta$) according to the moving speed.

For example, in the 5G NR network, it may be necessary to compensate the size of the measurement area according to the moving speed to improve measurement accuracy in the case of high-speed movement considering the high-speed movement of the electronic device 1400. When the electronic device 1400 moves at high speed, because the cell coverage and the time for the electronic device to be located in each area (the cell center area (or the first area), the handover composing area (or the second area), the handover impending area (or the third area)) inside the cell are short, sufficient time for non-serving module monitoring and neighbor cell measurement may not be secured, the electronic device 1400 may increase the size of the correction value included when configuring the boundary for determining the measurement area, thereby configuring the cell outer area and the handover impending area wider to ensure sufficient opportunities for module monitoring and neighbor cell measurements. In this way, when the boundary is corrected considering the high-speed movement, frequency and accuracy of module monitoring and neighbor cell measurement may be increased in preparation for rapid channel change.

In contrast, when the electronic device 1400 is moving at a low speed, because it is possible to secure sufficient opportunities for non-serving module monitoring and neighbor cell measurement, the electronic device 1400 may narrow the cell outer area and the handover impending area by reducing the size of the correction value included when configuring the boundary for determining the measurement area. Through this, accuracy may be improved in performing module monitoring and neighbor cell measurement by responding less sensitively to channel changes during low-speed movement.

Figure 15:
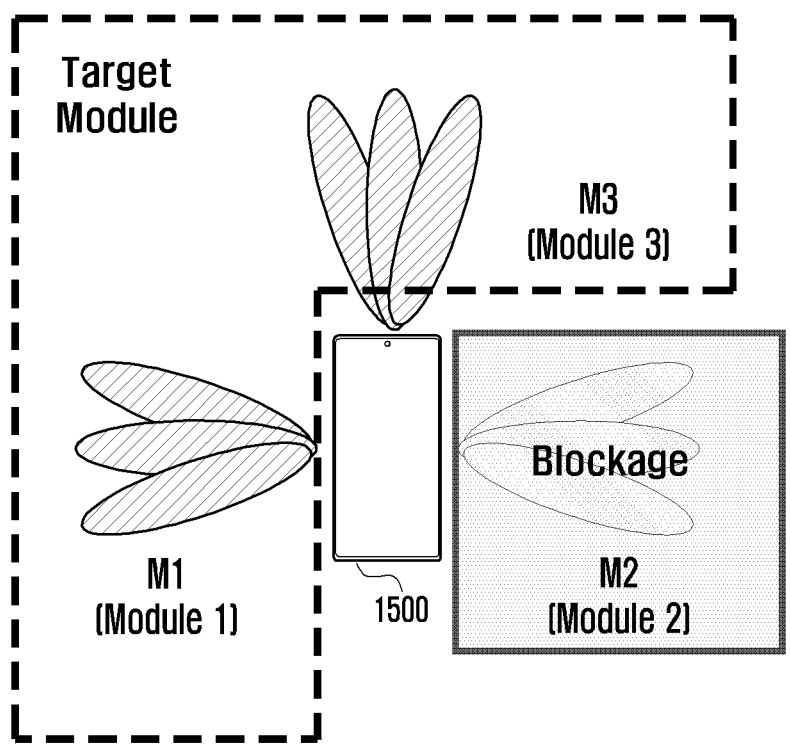
FIG. 15 illustrates a method of determining a target module in an RF module block by an electronic device according to an embodiment of the disclosure.

FIG. 15 illustrates a method of determining a target module in an RF module block by an electronic device according to an embodiment of the disclosure.

According to various embodiments, when a block is detected at a location where any one of the RF modules is disposed, the electronic device 1500 may perform module monitoring by using the remaining RF modules except for the corresponding RF module.

When using the electronic device 1500, transmission and reception of some RF modules of the electronic device 1500 may be affected due to a user's grip, and the like. Accordingly, the electronic device 1500 may perform module monitoring by using at least one of the RF modules excluding the corresponding RF module when a certain level of signal attenuation is detected in a specific RF module or the user's grip is detected in a specific location through a separate sensor (e.g., a grip sensor). Referring to FIG. 15, when a block occurs on the left side of the electronic device 1500, a module monitoring may be performed by using RF module M1 forming a reception beam on the right side and RF module M3 forming a reception beam on the upper side, except for RF module M2 disposed at the corresponding location to form a reception beam. According to another embodiment, when a block of a serving module is detected while the electronic device 1500 is performing monitoring by using one RF module, the serving module may be changed to at least one of the remaining RF modules. In addition, when a block of one serving module is detected while the electronic device 1500 is performing monitoring by using a plurality of RF modules, a monitoring may be performed by using the rest of the serving modules or at least some of the non-serving modules may be added as serving modules.

An electronic device according to various embodiments may include a wireless communication circuit including a plurality of RF modules, a memory configured to store a plurality of reference values for classifying a plurality of areas within a cell to which the electronic device belongs, and a processor, and the processor may be configured to determine, based on at least one of a first broadcasting signal received from a base station in the cell and the plurality of reference values stored in the memory, at least one RF module among the plurality of RF modules to monitor a second broadcasting signal transmitted from the base station and a period of the monitoring, and perform the monitoring by using the determined at least one RF module according to the determined period.

According to various embodiments, the processor may be configured to determine an area within the cell where the electronic device is located by comparing a reference signal received power (RSRP) of the first broadcasting signal received from the base station in the cell with at least one of the plurality of reference values stored in the memory.

According to various embodiments, the processor may be configured to determine that the electronic device is located in a first area adjacent to the base station when the RSRP of the first broadcasting signal received from the base station is greater than or equal to a first reference value among the plurality of reference values.

According to various embodiments, the processor may be configured to reduce the monitoring period when it is determined that the electronic device is located in the first area.

According to various embodiments, the processor may be configured to perform the monitoring by using a serving module that forms a reception beam for a serving cell to which the base station belongs among the plurality of RF modules when the RSRP of the signal received from the base station is less than the first reference value and is greater than or equal to the second reference value among the plurality of reference values, and the monitoring may be configured to be performed when the electronic device is located in a second area other than the first area.

According to various embodiments, the processor may be configured to perform the monitoring by using a non-serving module that does not form a reception beam for the serving module and the serving cell among the plurality of RF modules when the RSRP of the first broadcasting signal received from the base station is less than the second reference value, and the monitoring may be configured to be performed when the electronic device is located in a third area other than the first area and the second area.

According to various embodiments, the processor may be configured to determine a moving speed of the electronic device, and adjust at least some of the plurality of reference values stored in the memory based on the determined moving speed.

According to various embodiments, the processor may be configured to perform the monitoring by using at least some of the RF modules excluding the blocked RF module when at least some of the plurality of RF modules are blocked.

According to various embodiments, the processor may be configured to determine activation time and deactivation time of monitoring the second broadcasting signal by using the RF module according to the determined period during a connected mode discontinuous reception (CDRX) operation.

According to various embodiments, the electronic device may be configured to support a 5G NR network.

A method of selecting a RF module for beamforming of an electronic device according to various embodiments, wherein the electronic device may include a plurality of RF modules, and a memory configured to store a plurality of reference values for classifying a plurality of areas within a cell to which the electronic device belongs, the method may include determining, based on at least one of a first broadcasting signal received from a base station in the cell and a plurality of reference values stored in the memory, at least one RF module among the plurality of RF modules to monitor a second broadcasting signal transmitted from the base station and a period of the monitoring, and performing the monitoring by using the determined at least one RF module according to the determined period.

According to various embodiments, the determining the at least one RF module and the period of the monitoring may include determining an area within the cell where the electronic device is located by comparing a reference signal received power (RSRP) of the first broadcasting signal received from the base station in the cell with at least one of the plurality of reference values stored in the memory.

According to various embodiments, the determining the area within the cell where the electronic device is located may include determining that the electronic device is located in a first area adjacent to the base station when the RSRP of the first broadcasting signal received from the base station is greater than or equal to a first reference value among the plurality of reference values.

According to various embodiments, the determining the at least one RF module and the period of the monitoring may include reducing the monitoring period when it is determined that the electronic device is located in the first area.

According to various embodiments, the determining the area within the cell where the electronic device is located may include performing the monitoring by using a serving module that forms a reception beam for a serving cell to which the base station belongs among the plurality of RF modules when the RSRP of the signal received from the base station is less than the first reference value and is greater than or equal to the second reference value among the plurality of reference values, and the performing the monitoring may include performing the monitoring when the electronic device is located in a second area other than the first area.

According to various embodiments, the determining the area within the cell where the electronic device is located may include performing the monitoring by using a non-serving module that does not form a reception beam for the serving module and the serving cell among the plurality of RF modules when the RSRP of the first broadcasting signal received from the base station is less than the second reference value, and the performing the monitoring may include performing the monitoring when the electronic device is located in a third area other than the first area and the second area.

According to various embodiments, determining a moving speed of the electronic device, and adjusting at least some of the plurality of reference values stored in the memory based on the determined moving speed may be further included.

According to various embodiments, performing the monitoring by using at least some of the RF modules excluding the blocked RF module when at least some of the plurality of RF modules are blocked may be further included.

According to various embodiments, determining activation time and deactivation time of monitoring the second broadcasting signal by using the RF module according to the determined period during a connected mode discontinuous reception (CDRX) operation may be included.

According to various embodiments, the electronic device may be configured to support a 5G NR network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a wireless communication circuit including a plurality of radio frequency (RF) modules;
    a memory configured to store a plurality of reference values for classifying a plurality of areas within a cell to which the electronic device belongs; and
    at least one processor,
    wherein the at least one processor is configured to:
        determine, based on at least one of a first broadcasting signal received from a base station in the cell and the plurality of reference values stored in the memory, at least one RF module among the plurality of RF modules to monitor a second broadcasting signal transmitted from the base station and a period of the monitoring, and
        perform the monitoring by using the determined at least one RF module according to the determined period.

2. The electronic device of claim 1, wherein the at least one processor is further configured to determine an area within the cell where the electronic device is located by comparing a reference signal received power (RSRP) of the first broadcasting signal received from the base station in the cell with at least one of the plurality of reference values stored in the memory.

3. The electronic device of claim 2, wherein the at least one processor is further configured to determine that the electronic device is located in a first area adjacent to the base station in case that the RSRP of the first broadcasting signal received from the base station is greater than or equal to a first reference value among the plurality of reference values.

4. The electronic device of claim 3, wherein the at least one processor is further configured to reduce the monitoring period in case that it is determined that the electronic device is located in the first area.

5. The electronic device of claim 3,
    wherein the at least one processor is further configured to perform the monitoring by using a serving module that forms a reception beam for a serving cell to which the base station belongs among the plurality of RF modules in case that the RSRP of the signal received from the base station is less than a first reference value and is greater than or equal to a second reference value among the plurality of reference values, and
    wherein the monitoring is performed in case that the electronic device is located in a second area other than the first area.

6. The electronic device of claim 5,
    wherein the at least one processor is further configured to perform the monitoring by using a non-serving module that does not form a reception beam for the serving module and the serving cell among the plurality of RF modules in case that the RSRP of the first broadcasting signal received from the base station is less than the second reference value, and
    wherein the monitoring is performed in case that the electronic device is located in a third area other than the first area and the second area.

7. The electronic device of claim 1, wherein the at least one processor is further configured to:
    determine a moving speed of the electronic device; and
    adjust at least some of the plurality of reference values stored in the memory based on the determined moving speed.

8. The electronic device of claim 1, wherein the at least one processor is further configured to perform the monitoring by using at least some of the RF modules excluding the blocked RF module in case that at least some of the plurality of RF modules are blocked.

9. The electronic device of claim 1, wherein the at least one processor is further configured to determine activation time and deactivation time of monitoring the second broadcasting signal by using the RF module according to the determined period during a connected mode discontinuous reception (CDRX) operation.

10. The electronic device of claim 1, wherein the electronic device is configured to support a fifth generation (5G) new radio (NR) network.

11. A method of selecting a radio frequency (RF) module for beamforming of an electronic device, the electronic device comprising: a plurality of RF modules, and a memory configured to store a plurality of reference values for classifying a plurality of areas within a cell to which the electronic device belongs, the method comprising:
    determining, based on at least one of a first broadcasting signal received from a base station in the cell and a plurality of reference values stored in the memory, at least one RF module among the plurality of RF modules to monitor a second broadcasting signal transmitted from the base station and a period of the monitoring, and
    performing the monitoring by using the determined at least one RF module according to the determined period.

12. The method of claim 11, wherein the determining of the at least one RF module and the period of the monitoring comprises:
  determining an area within the cell where the electronic device is located by comparing a reference signal received power (RSRP) of the first broadcasting signal received from the base station in the cell with at least one of the plurality of reference values stored in the memory.

13. The method of claim 12,
  wherein the determining of the area within the cell where the electronic device is located comprises determining that the electronic device is located in a first area adjacent to the base station in case that the RSRP of the first broadcasting signal received from the base station is greater than or equal to a first reference value among the plurality of reference values, and
  wherein the determining of the at least one RF module and the period of the monitoring comprises reducing the monitoring period in case that it is determined that the electronic device is located in the first area.

14. The method of claim 13,
  wherein the determining of the area within the cell where the electronic device is located comprises performing the monitoring by using a serving module that forms a reception beam for a serving cell to which the base station belongs among the plurality of RF modules in case that the RSRP of the signal received from the base station is less than a first reference value and is greater than or equal to a second reference value among the plurality of reference values, and
  wherein the performing of the monitoring comprises performing the monitoring in case that the electronic device is located in a second area other than the first area.

15. The method of claim 14,
  wherein the determining of the area within the cell where the electronic device is located comprises performing the monitoring by using a non-serving module that does not form a reception beam for the serving module and the serving cell among the plurality of RF modules in case that the RSRP of the first broadcasting signal received from the base station is less than the second reference value, and
  wherein the performing of the monitoring comprises performing the monitoring in case that the electronic device is located in a third area other than the first area and the second area.

16. The method of claim 11, further comprising:
  determining a moving speed of the electronic device; and
  adjusting at least some of the plurality of reference values stored in the memory based on the determined moving speed.

17. The method of claim 11, further comprising:
  performing the monitoring by using at least some of the RF modules excluding the blocked RF module in case that at least some of the plurality of RF modules are blocked.

18. The method of claim 11, further comprising:
  determining activation time and deactivation time of monitoring the second broadcasting signal by using the RF module according to the determined period during a connected mode discontinuous reception (CDRX) operation.

19. The method of claim 11, wherein the electronic device is configured to support a fifth generation (5G) new radio (NR) network.

* * * * *